(12) United States Patent
Rotter et al.

(10) Patent No.: US 9,144,959 B1
(45) Date of Patent: Sep. 29, 2015

(54) METHODS FOR ASSEMBLING A SKIN OF A COMPOSITE STRUCTURE

(71) Applicant: The Boeing Company, Seal Beach, CA (US)

(72) Inventors: Daniel M. Rotter, Lake Forest Park, WA (US); Arvid J. Berg, Seattle, WA (US); Joseph D. Anderson, Seattle, WA (US); Kurtis Shuldberg Willden, Kent, WA (US); Richard V. Phillips, Enumclaw, WA (US); Stephen Lee Metschan, Black Diamond, WA (US); Brad Andrew Coxon, Everett, WA (US); Joseph J. Pruss, Redmond, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 14/018,268

(22) Filed: Sep. 4, 2013

(51) Int. Cl.
   *B29C 70/44* (2006.01)
   *B32B 37/00* (2006.01)
   *B29C 65/00* (2006.01)

(52) U.S. Cl.
   CPC ........... *B32B 37/0046* (2013.01); *B29C 66/345* (2013.01); *B29C 66/81455* (2013.01); *B29C 70/44* (2013.01); *Y10T 156/1028* (2015.01)

(58) Field of Classification Search
   None
   See application file for complete search history.

(56) References Cited

U.S. PATENT DOCUMENTS

| | | | |
|---|---|---|---|
| 2,679,278 A | | 5/1954 | Clark |
| 5,427,518 A | * | 6/1995 | Morizot et al. ............... 425/504 |
| 7,228,611 B2 | | 6/2007 | Anderson et al. |
| 7,527,222 B2 | | 5/2009 | Biornstad et al. |
| 7,624,488 B2 | | 12/2009 | Lum et al. |
| 7,879,177 B2 | | 2/2011 | McCowin et al. |
| 8,157,212 B2 | | 4/2012 | Biornstad et al. |
| 8,168,023 B2 | | 5/2012 | Chapman et al. |
| 8,182,628 B2 | | 5/2012 | Biornstad et al. |
| 2010/0011580 A1 | | 1/2010 | Brennan et al. |
| 2010/0012260 A1 | | 1/2010 | Brennan et al. |
| 2012/0121866 A1 | * | 5/2012 | Hawkins et al. .............. 428/174 |

OTHER PUBLICATIONS

U.S. Appl. No. 13/626,452, Sep. 25, 2012, Robins et al.
U.S. Appl. No. 13/732,961, Jan. 2, 2013, Rotter et al.

* cited by examiner

*Primary Examiner* — Barbara J Musser
(74) *Attorney, Agent, or Firm* — Dascenzo Intellectual Property Law, P.C.

(57) ABSTRACT

Systems and methods for assembling a skin of a composite structure are disclosed herein. The methods include operatively attaching a charge of composite material to a flexible substrate to define an initial conformation for a composite-substrate assembly, deforming the composite-substrate assembly to an intermediate conformation that is different from the initial conformation, affixing the charge of composite material to an outer surface of a layup mandrel, and releasing the charge of composite material from the flexible substrate while retaining the charge of composite material on the outer surface of the layup mandrel. The systems include the flexible substrate, an assembly deformation structure that is configured to deform the composite-substrate assembly from the initial conformation to the intermediate conformation, and the layup mandrel that receives the charge of composite material.

20 Claims, 11 Drawing Sheets

METHODS FOR ASSEMBLING A SKIN OF A COMPOSITE STRUCTURE

FIELD

The present disclosure is directed generally to systems and methods for assembling a skin of a composite structure, and more particularly to systems and methods that utilize a flexible substrate to support a charge of composite material that forms a portion of the skin of the composite structure.

BACKGROUND

Historically, construction and/or assembly of a composite structure on a layup mandrel is a serial process that involves sequentially forming a plurality of support structures, such as stringers and/or spacers, on an outer surface of the layup mandrel, followed by locating a continuous, or at least substantially continuous, length of composite fibers around the outer surface of the layup mandrel to form a skin of the composite structure. This locating may be accomplished by wrapping the length of composite fibers around the outer surface of the layup mandrel, such as by rotating the layup mandrel with respect to a layup head that dispenses the length of composite fibers and/or by rotating the layup head relative to the layup mandrel.

Generally, the support structures are formed from a plurality of plies, or layers, of a composite material, such as a pre-preg material, and each layer of the plurality of layers may be applied individually and/or sequentially to the outer surface of the layup mandrel. Similarly, the skin typically includes a plurality of layers, with each layer of the plurality of layers being applied individually and/or sequentially to the outer surface of the layup mandrel.

As composite structures become larger and more complex, such as may be the case for composite barrel assemblies for an airplane fuselage, the time required to perform the above-described serial processes becomes significant. In addition, a cost of layup mandrels for large and/or complex composite structures is substantial. Thus, there exists a need for improved systems and methods for assembling a skin of a composite structure.

SUMMARY

Systems and methods for assembling a skin of a composite structure are disclosed herein. The systems include the flexible substrate, an assembly deformation structure that is configured to deform the composite-substrate assembly from the initial conformation to the intermediate conformation, and the layup mandrel that receives the charge of composite material.

The methods include operatively attaching a charge of composite material to a flexible substrate to define an initial conformation for a composite-substrate assembly, deforming the composite-substrate assembly to an intermediate conformation that is different from the initial conformation, affixing the charge of composite material to an outer surface of a layup mandrel, and releasing the charge of composite material from the flexible substrate while retaining the charge of composite material on the outer surface of the layup mandrel. In some embodiments, the operatively attaching includes applying a retention vacuum between the charge of composite material and the flexible substrate with a retention vacuum that is defined by the flexible substrate. In some embodiments, the methods further include maintaining the retention vacuum during the deforming to retain the charge of composite material on the flexible substrate. In some embodiments, the methods further include regulating a magnitude of the retention vacuum during the deforming to control a relative motion between the charge of composite material and the flexible substrate. In some embodiments, the releasing includes ceasing the applying the retention vacuum.

In some embodiments, the deforming includes deforming such that the composite-substrate assembly defines a concave side and a convex side. In some embodiments, the charge of composite material is located on the concave side. In some embodiments, the deforming includes suspending the composite-substrate assembly from a tether. In some embodiments, the methods further include conforming the composite-substrate assembly to the outer surface of the layup mandrel by tightening the tether.

In some embodiments, the flexible substrate is located on a non-planar surface of a non-planar transfer tool during the operatively attaching. In some embodiments, the non-planar surface defines the initial conformation. In some embodiments, the deforming includes inflating a deformation bladder. In some embodiments, the flexible substrate defines a first edge and an opposed second edge and the deforming includes urging the first edge toward the second edge. In some embodiment, the urging includes extending a tether between the first edge and the second edge. In some embodiments, the urging includes directing a first external force toward the first edge and concurrently directing a second external force toward the second edge.

In some embodiments, the methods further include compacting the charge of composite material on the outer surface of the layup mandrel. In some embodiments, the compacting includes applying a compaction vacuum between the flexible substrate and the outer surface of the layup mandrel with a compaction vacuum manifold that is defined by the flexible substrate.

In some embodiments, the methods further include pinning the composite-substrate assembly to the layup mandrel. In some embodiments, the methods further include repeating the methods to retain a plurality of charges of composite material on the outer surface of the layup mandrel.

DESCRIPTION

Figure 1:
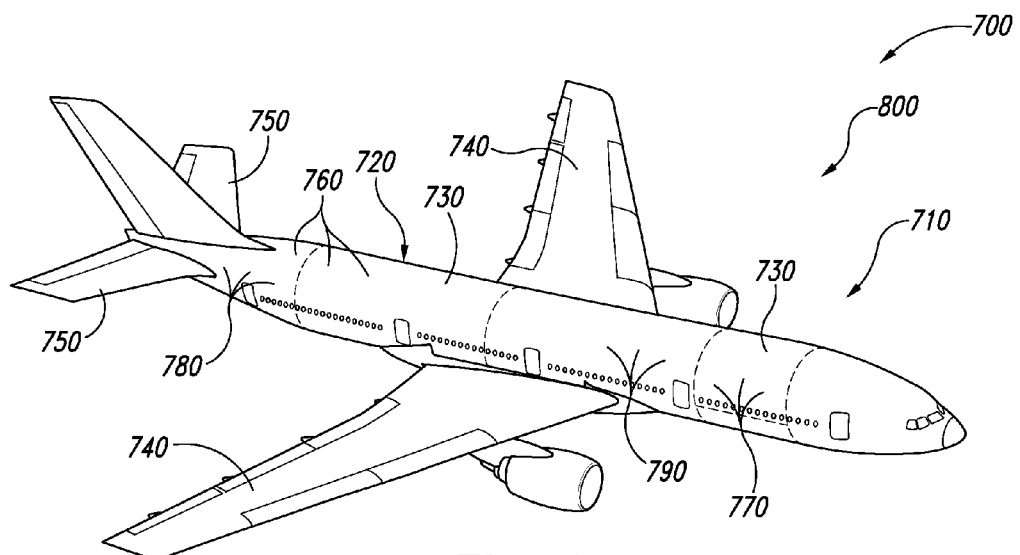
FIG. 1 is an illustrative, non-exclusive example of an aircraft that includes a composite structure that may be formed using the systems and methods according to the present disclosure.

FIGS. 1-15 provide illustrative, non-exclusive examples of composite structures 800, composite structure manufacturing apparatus 20, and/or components thereof according to the present disclosure. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
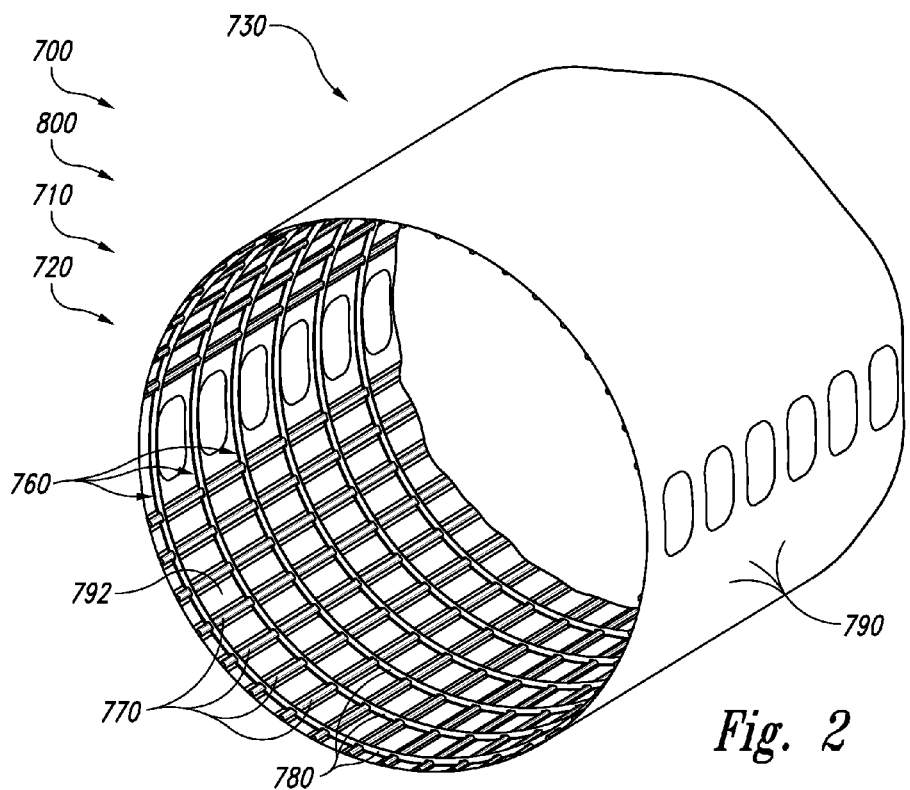
FIG. 2 is an illustrative, non-exclusive example of a fuselage barrel that includes a composite structure that may be formed using the systems and methods according to the present disclosure.

FIG. 1 is an illustrative, non-exclusive example of an aircraft 700 that includes a composite structure 800 that may be formed using the systems and methods according to the present disclosure, and FIG. 2 is an illustrative, non-exclusive example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700 and that also may be referred to herein as a non-planar skin 790. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

Figure 3:
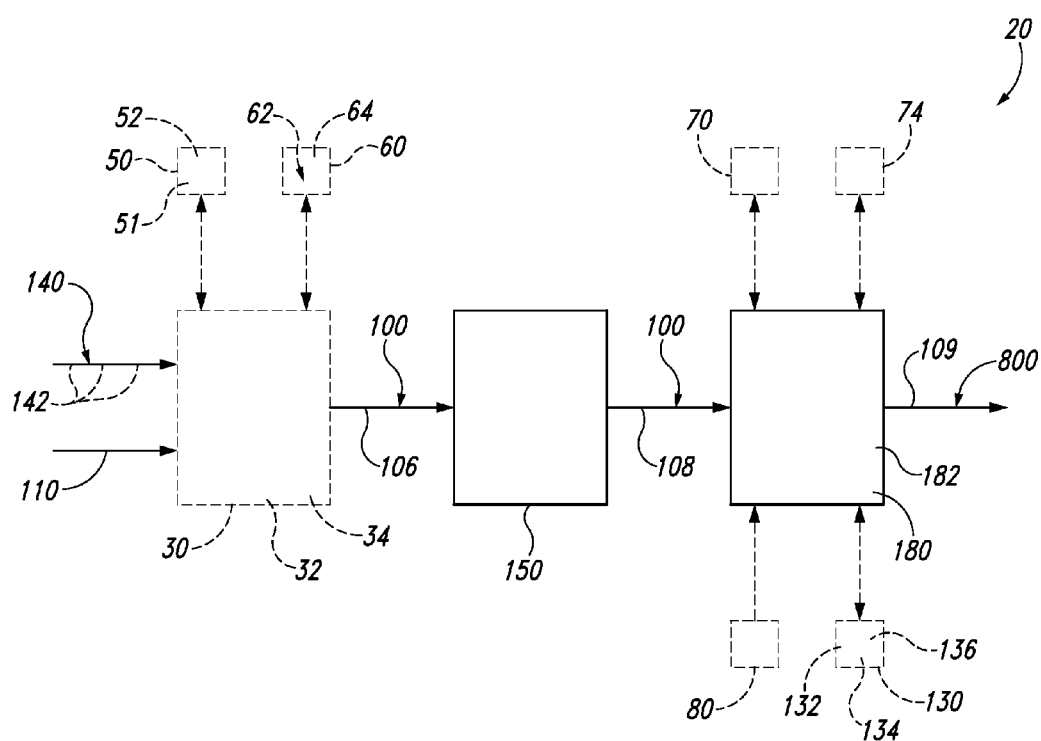
FIG. 3 is a schematic block diagram of a composite structure manufacturing apparatus according to the present disclosure.

FIG. 3 is a schematic block diagram of a composite structure manufacturing apparatus 20 according to the present disclosure. Composite structure manufacturing apparatus 20 is configured to operatively attach a flexible substrate 110 to a charge of composite material 140 to form a composite-substrate assembly 100. Composite-substrate assembly 100 is then provided to an assembly deformation structure 150 that is configured to deform composite-substrate assembly 100 from an initial conformation 106 to an intermediate conformation 108 that is different from the initial conformation. Composite-substrate assembly 100 then is provided to a layup mandrel 180. Layup mandrel 180 defines an outer surface 182 that is configured to receive charge of composite material 140 and/or to deform charge of composite material 140 to a final conformation 109 to produce at least a portion of a composite structure 800. Additional illustrative, non-exclusive examples of composite structure manufacturing apparatus 20, which also may be referred to herein as composite structure fabrication assembly 20 and/or as apparatus 20, are disclosed in U.S. patent application Ser. No. 13/886,976, which is entitled SYSTEMS AND METHODS OF FORMING A SKIN FOR A COMPOSITE STRUCTURE AND COMPOSITE STRUCTURES INCLUDING THE SAME, was filed on May 3, 2013, the complete disclosure of which is hereby incorporated by reference.

As illustrated in dashed lines in FIG. 3, composite structure manufacturing apparatus 20 further may include a layup surface 30 that is configured to receive and/or support flexible substrate 110 and/or charge of composite material 140 while flexible substrate 110 is being operatively attached to charge of composite material 140 (and/or while charge of composite material 140 is being operatively attached to flexible substrate 110). Layup surface 30 may be a planar layup surface 32 and/or a non-planar layup surface 34.

A charge compaction assembly 50 may be utilized to compact charge of composite material 140 on flexible substrate 110. This may decrease a volume of charge of composite material 140, increase an adhesive force between charge of composite material 140 and flexible substrate 110, and/or increase an adhesive force among a plurality of plies 142 of composite material that comprise charge of composite material 140. Additionally or alternatively, an interfacial force control assembly 60 may be utilized to control an interfacial force that is present between charge of composite material 140 and flexible substrate 110, as discussed in more detail herein.

As also illustrated in dashed lines in FIG. 3, composite structure manufacturing apparatus 20 further may include a locating assembly 70 that is configured to locate and/or orient composite-substrate assembly 100 relative to layup mandrel 180 to define a target (or desired) orientation (or relative orientation) therebetween. Composite structure manufacturing apparatus 20 also may include a retention structure 74 that is configured to (temporarily) retain composite-substrate assembly 100 on layup mandrel 180.

In addition, composite structure manufacturing apparatus 20 also may include a heating assembly 80 that is configured to heat one or more components of composite structure manufacturing apparatus 20 and/or of composite-substrate assembly 100. Additionally or alternatively, composite structure manufacturing apparatus 20 also may include a skin compaction assembly 130 that is configured to compact charge of composite material 140 on outer surface 182 of layup mandrel 180.

Assembly deformation structure 150 may include any suitable structure that is configured to deform composite-substrate assembly 100 from initial conformation 106 to intermediate conformation 108. As an illustrative, non-exclusive example, assembly deformation structure 150 may be configured to deform composite-substrate assembly 100 such that the composite-substrate assembly defines (or has) a concave side and an opposed convex side. Under these conditions, charge of composite material 140 may be located on the concave side of composite-substrate assembly 100. Additionally or alternatively, flexible substrate 110 may be located on the convex side of the composite-substrate assembly. More specific but still illustrative, non-exclusive examples of assembly deformation structures 150 are discussed in more detail herein with reference to FIGS. 6-13.

Interfacial force control assembly 60 may include any suitable structure that is configured to regulate the interfacial force that is applied (or present) between charge of composite material 140 and flexible substrate 110. This may include regulating to retain charge of composite material 140 on flexible substrate 110 and/or to control relative motion and/or slippage between charge of composite material 140 and flexible substrate 110, such as during deformation from initial conformation 106 to intermediate conformation 108 and/or during deformation from intermediate conformation 108 to final conformation 109. As an illustrative, non-exclusive example, interfacial force control assembly 60 may include and/or be a retention vacuum assembly 62 that is configured to apply a retention vacuum between charge of composite material 140 and flexible substrate 110. As another illustrative, non-exclusive example, retention vacuum assembly 62 may include and/or be a retention vacuum manifold 64 that may be defined, at least in part, by flexible substrate 110, as discussed in more detail herein.

Locating assembly 70 may include any suitable structure that is configured to align composite-substrate assembly 100 with layup mandrel 180. As an illustrative, non-exclusive example, locating assembly 70 may include and/or be an alignment pin that extends through flexible substrate 110 and into an alignment pin receptacle that may be defined within and/or by layup mandrel 180.

Similarly, retention structure 74 may include any suitable structure that is configured to retain composite-substrate assembly 100 on outer surface 182 of layup mandrel 180. As an illustrative, non-exclusive example, retention structure 74 may include and/or be a retention pin that extends through flexible substrate 110 and into a respective retention pin receptacle that may be defined within and/or by layup mandrel 180.

Heating assembly 80 may include any suitable structure that is configured to heat at least a portion of composite structure manufacturing apparatus 20 and/or composite-substrate assembly 100. As an illustrative, non-exclusive example, heating assembly 80 may be configured to heat composite-substrate assembly 100, flexible substrate 110, and/or charge of composite material 140 to permit, facilitate, and/or increase a rate of deformation of the composite-substrate assembly while transitioning from initial conformation 106 to intermediate conformation 108 and/or while transitioning from intermediate conformation 108 to final conformation 109. Illustrative, non-exclusive examples, of heating assembly 80 include a heat blanket, a heat lamp, an electric heater, a resistive heater, a combustion heater, a conductive heater, a convective heater, and/or a radiative heater.

Charge compaction assembly 50 may include any suitable structure that is configured to compact charge of composite material 140 on (or onto) flexible substrate 110. As an illustrative, non-exclusive example, charge compaction assembly 50 may include and/or be a vacuum bag 51. As another illustrative, non-exclusive example, charge compaction assembly 50 also may include and/or be a vacuum chuck 52. Illustrative, non-exclusive examples of vacuum chucks are disclosed in U.S. patent application Ser. No. 13/887,006, which is entitled FLEXIBLE MATERIAL TRANSFER DEVICES, FLEXIBLE VACUUM COMPACTION DEVICES, FLEXIBLE VACUUM CHUCKS, AND SYSTEMS AND METHODS INCLUDING THE SAME, was filed on May 3, 2013, the complete disclosure of which is hereby incorporated by reference.

Skin compaction assembly 130 may include any suitable structure that is configured to compact charge of composite material 140 on outer surface 182 of layup mandrel 180. As an illustrative, non-exclusive example, skin compaction assembly 130 may be configured to apply a compaction vacuum between flexible substrate 110 and outer surface 182 of layup mandrel 180 to compact charge of composite material 140 therebetween. As another illustrative, non-exclusive example, skin compaction assembly 130 may include a compaction vacuum manifold 132 that is (at least partially) defined by flexible substrate 110 and that is configured to provide the compaction vacuum. As yet another illustrative, non-exclusive example, skin compaction assembly 130 further may include a compaction vacuum source 134 that is in fluid communication with the compaction vacuum manifold and/or that is configured to generate the compaction vacuum. As a more specific but still illustrative, non-exclusive example, skin compaction assembly 130 may include and/or be a vacuum chuck 136, illustrative, non-exclusive examples of which are disclosed in U.S. patent application Ser. No. 13/887,006, which is incorporated herein.

Layup mandrel 180 may include any suitable structure that has and/or defines outer surface 182 that is configured to receive charge of composite material 140. As illustrative, non-exclusive examples, layup mandrel 180 may include and/or be an outer mold line layup mandrel and/or an inner mold line layup mandrel. As additional illustrative, non-exclusive examples, layup mandrel 180 may define a contour of a surface, an inner surface, and/or an outer surface of at least one of an aircraft, a portion of an aircraft, an airframe, a portion of an airframe, a fuselage, a portion of a fuselage, a fuselage barrel, a portion of a fuselage barrel, a wing, a portion of a wing, an elevator, a portion of an elevator, a rudder, a portion of a rudder, a flap, a portion of a flap, an engine nacelle, a portion of an engine nacelle, an engine cowl, a portion of an engine cowl, a stabilizer, and a portion of a stabilizer.

Initial conformation 106 and/or intermediate conformation 108 may define any suitable conformation, shape, contour, and/or surface profile. As an illustrative, non-exclusive example, initial conformation 106 may include and/or be a planar, or at least substantially planar, conformation. As additional illustrative, non-exclusive examples, initial conformation 106 may include and/or be a non-planar conformation and/or an arcuate conformation.

In addition, intermediate conformation 108 may include and/or be a non-planar and/or an arcuate conformation. As an illustrative, non-exclusive example, intermediate conformation 108 may correspond to a surface profile, or contour, of outer surface 182 of layup mandrel 180. As discussed, initial conformation 106 is different from intermediate conformation 108. As an illustrative, non-exclusive example, a radius of curvature that is defined by intermediate conformation 108 may be less than a radius of curvature that is defined by initial conformation 106.

Figure 4:
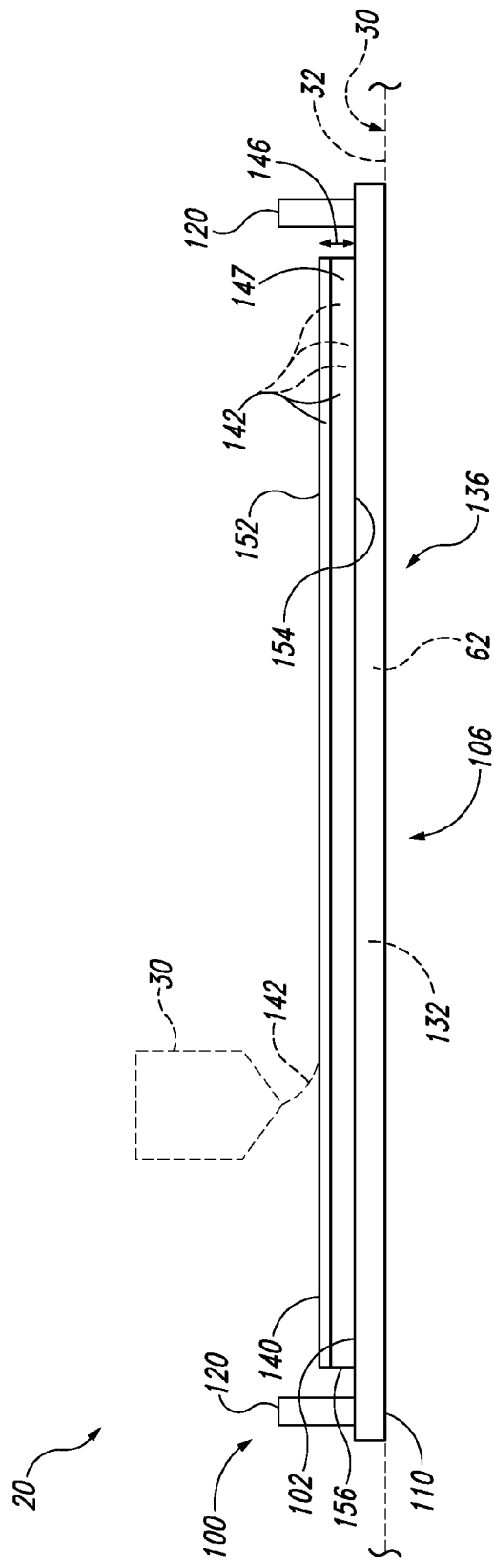
FIG. 4 is a schematic cross-sectional view of illustrative, non-exclusive examples of a composite-substrate assembly that may be included in and/or utilized with a composite structure manufacturing apparatus according to the present disclosure.
Figure 5:
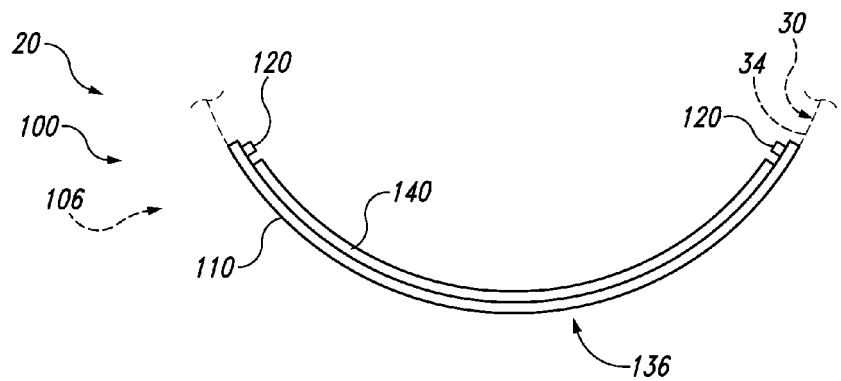
FIG. 5 is another schematic cross-sectional view of illustrative, non-exclusive examples of a composite-substrate assembly that may be included in and/or utilized with a composite structure manufacturing apparatus according to the present disclosure.

FIGS. 4-5 are schematic cross-sectional views of illustrative, non-exclusive examples of composite-substrate assemblies 100 that may be included in and/or utilized with composite structure manufacturing apparatus 20 according to the present disclosure. FIG. 4 illustrates composite-substrate assembly 100 in a planar, or at least substantially planar, initial conformation 106, such as might be obtained if composite-substrate assembly 100 is formed on a planar layup surface 32. In contrast, FIG. 5 illustrates composite-substrate assembly 100 in an arcuate, curvilinear, and/or otherwise non-planar initial conformation 106, such as might be obtained if composite-substrate assembly 100 is formed on a non-planar layup surface 34. In FIGS. 4-5, composite-substrate assembly 100 includes a flexible substrate 110 and a charge of composite material 140 that is operatively attached to the flexible substrate. As discussed, composite-substrate assembly 100 may include a vacuum chuck 136 that further includes a sealing structure 120 that is configured to form a fluid seal with outer surface 182 of layup mandrel 180 (as illustrated in FIGS. 7, 9, 11, and 13). Additional illustrative, non-exclusive examples of composite-substrate assemblies 100 are disclosed in U.S. patent application Ser. No. 13/693, 887, which is entitled SYSTEMS AND METHODS FOR ASSEMBLING A SKIN OF A COMPOSITE STRUCTURE, was filed on Dec. 4, 2012, the complete disclosure of which is hereby incorporated by reference.

As perhaps illustrated most clearly in FIG. 4, charge of composite material 140 is operatively attached to flexible substrate 110 to define an interface therebetween. It is within the scope of the present disclosure that charge of composite material 140 may be operatively attached to flexible substrate 110 in any suitable manner. As an illustrative, non-exclusive example, charge of composite material 140 may be manually located on, manually placed in contact with, and/or manually adhered to flexible substrate 110. As another illustrative, non-exclusive example, and as illustrated in dashed lines in FIG. 4, a layup surface 30 may be utilized to locate and/or place a plurality of plies 142 of composite material on flexible substrate 110 to form and/or define charge of composite material 140.

Charge of composite material 140 may include any suitable structure that is defined by a plurality of stacked plies 142 of composite material. Stacked plies 142 also may be referred to herein as composite plies 142, stacked composite plies 142, layered composite plies 142, plies 142, layers 142, and/or layered composite tape 142. Charge of composite material 140 also may be referred to herein as charge 140, composite charge 140, stack 140 of composite material, and/or stack 140 of composite plies. Charge 140 may include any suitable number of stacked plies 142. As illustrative, non-exclusive examples, charge 140 may include at least 2, at least 3, at least 4, at least 6, at least 10, at least 15, at least 20, at least 30, at least 40, at least 50, or at least 60 stacked plies 142. Additionally or alternatively, charge 140 also may include fewer than 100, fewer than 90, fewer than 80, fewer than 70, fewer than 60, fewer than 50, or fewer than 40 stacked plies 142. Additionally or alternatively, charge 140 also may include one or more regions that include a different number of stacked plies 142 than one or more other regions thereof.

It is within the scope of the present disclosure that composite structure manufacturing apparatus 20 and/or charge 140 may be configured to permit and/or facilitate relative motion, or slipping, of one or more plies 142 within charge 140 relative to one or more other plies 142 during deformation of charge 140. As an illustrative, non-exclusive example, plies 142 may be cut and/or segmented to permit and/or facilitate this relative motion. As another illustrative, non-exclusive example, plies 142 may be oriented relative to one another to permit and/or facilitate this relative motion. As yet another illustrative, non-exclusive example, composite structure manufacturing apparatus 20 may include interfacial force control assembly 60 (as illustrated in FIG. 3).

Charge 140 may be a planar, or at least substantially planar, charge of composite material 140. As an illustrative, non-exclusive example, and as illustrated in FIG. 4, charge 140 may define two opposed sides 152 and 154, which also may be referred to herein as first side 152 and second side 154, that may be separated by the thickness 146 of the charge of composite material. As illustrated, first side 152 may form an exposed surface of composite-substrate assembly 100, while second side 154 may define a portion of interface 102. In addition, opposed sides 152 and 154, together with one or more edges 156, may define a surface area of charge 140, and it is within the scope of the present disclosure that opposed sides 152 and 154 may define at least a threshold fraction of the surface area of charge 140. As illustrative, non-exclusive examples, the threshold fraction of the surface area may be at least 50%, at least 60%, at least 70%, at least 75%, at least 80%, at least 85%, at least 90%, at least 95%, or at least 99% of the surface area of charge 140.

In addition, first side 152 and/or second side 154 may define any suitable area, or surface area. As illustrative, non-exclusive examples, the surface area may be at least 1 square meter, at least 2 square meters, at least 3 square meters, at least 4 square meters, at least 6 square meters, at least 8 square meters, at least 10 square meters, at least 12 square meters, at least 15 square meters, or at least 20 square meters.

Charge of composite material 140 may be formed and/or defined from any suitable composite material. As an illustrative, non-exclusive example, charge 140 may include and/or be a plurality of fibers, a cloth, a plurality of fibers embedded in a resin material, and/or a cloth that is embedded in a resin material. Illustrative, non-exclusive examples of the plurality of fibers include a plurality of carbon fibers, a plurality of polymeric fibers, and/or a plurality of glass fibers. Illustrative, non-exclusive examples of the cloth include a cloth that is formed from the plurality of fibers. Illustrative, non-exclusive examples of the resin material include an epoxy, an adhesive, and/or a polymeric resin. As more specific but still illustrative, non-exclusive examples, charge 140 may include and/or be a pre-impregnated composite material and/or a pre-impregnated composite tape. As another illustrative, non-exclusive example, charge 140 also may include and/or be a viscoelastic material.

Flexible substrate 110 may include any suitable structure that may be selected and/or configured to support and/or be operatively attached to charge 140 to form, or define, composite-substrate assembly 100. In addition and as discussed herein, flexible substrate 110 is flexible and thereby permits deformation of composite-substrate assembly 100.

As illustrative, non-exclusive examples, flexible substrate 110 may include and/or be formed from a polymeric material, a plastic, a polycarbonate, a polyester, a metal, and/or aluminum. It is within the scope of the present disclosure that flexible substrate 110 may define a continuous and/or monolithic structure that may be solid and/or void-free. Additionally or alternatively, it is also within the scope of the present disclosure that flexible substrate 110 may define one or more voids therein and/or may define a panel and/or a double-walled panel that may define at least a portion of compaction vacuum manifold 132, as discussed in more detail herein with reference to FIG. 15.

As another illustrative, non-exclusive example, flexible substrate 110 also may be referred to herein as and/or may be a sheet 110, a flexible sheet 110, a planar sheet 110, a planar substrate 110, and/or an at least substantially planar substrate 110. Additionally or alternatively, and similar to charge 140, flexible substrate 110 may define two opposed substrate sides and at least one substrate edge and the two opposed substrate sides may define at least a threshold fraction of a total surface area of flexible substrate 140. Illustrative, non-exclusive examples of the threshold fraction of the total surface area of flexible substrate 140 may be at least 50%, at least 60%, at least 70%, at least 75%, at least 80%, at least 85%, at least 90%, at least 95%, or at least 99% of the total surface area of flexible substrate 140.

Sealing structure 120 may include any suitable structure that is configured to form a fluid seal between outer surface 182 of layup mandrel 180 and flexible substrate 110 when composite-substrate assembly 100 is located on outer surface 182 and sealing structure 170 is compressed between outer surface 182 and flexible substrate 110. As an illustrative, non-exclusive example, sealing structure 120 may be operatively attached to flexible substrate 110 and may extend around a periphery of charge of composite material 140. Illustrative, non-exclusive examples of sealing structure 120 include a compression seal, a resilient seal, and/or a tubular resilient seal that may be formed from any suitable material, illustrative, non-exclusive examples of which include a resilient material, a polymeric material, latex, and/or urethane. This may include materials that do not adhere to, chemically react with, and/or transfer a contaminant to outer surface 182 and/or charge of composite material 140.

FIGS. 6-13 provide illustrative, non-exclusive examples of process flows for a composite structure manufacturing apparatus 20 according to the present disclosure and may be included in and/or utilized with composite structure manufacturing apparatus 20 of FIG. 3. Composite structure manufacturing apparatus 20 may include and/or utilize composite-substrate assemblies 100 (such as composite-substrate assemblies 100 of FIGS. 4-5) that include a charge of composite material 140 that is operatively attached to a flexible substrate 110 to create and/or fabricate composite structures 800. As discussed in more detail herein, this fabrication may include forming composite-substrate assembly 100 to define an initial conformation 106 thereof, deforming composite-substrate assembly 100 to an intermediate conformation 108 that is different from initial conformation 106, affixing charge of composite material 140 to an outer surface 182 of a layup mandrel 180 to define a final conformation 109 of charge of composite material 140, and/or releasing charge of composite material 140 from flexible substrate 110 while retaining charge of composite material 140 on outer surface 182 (as illustrated in FIG. 14).

Figure 6:
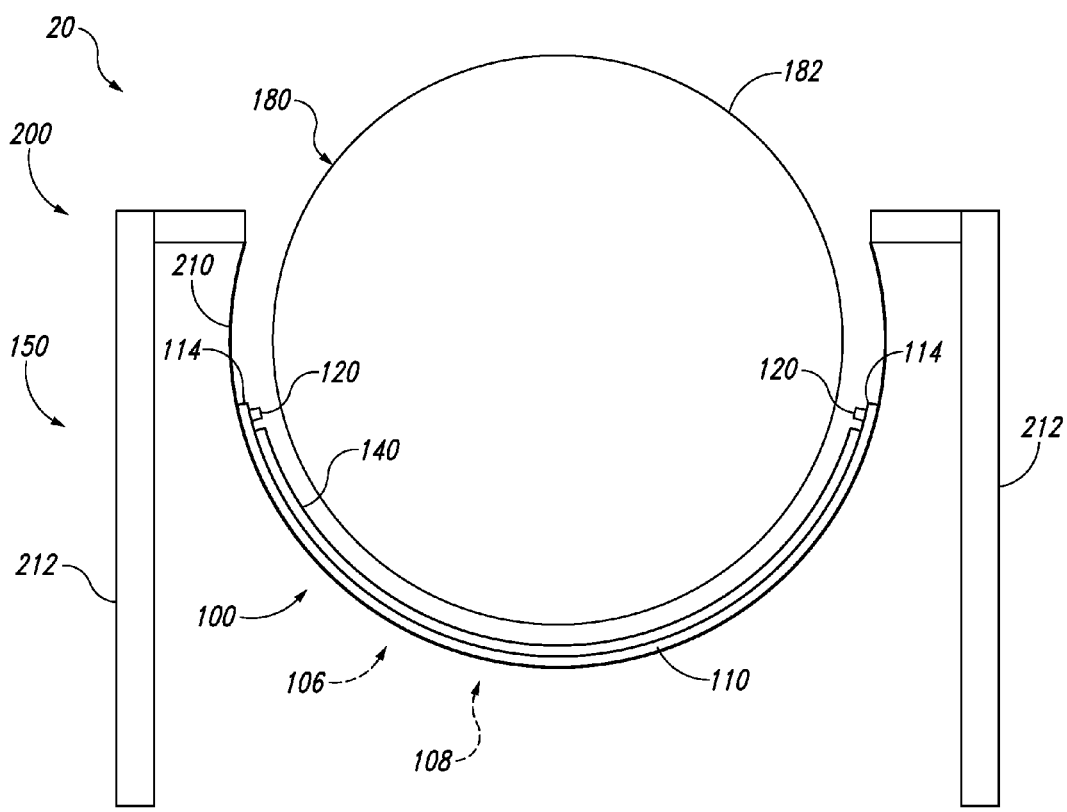
FIG. 6 is a schematic representation of a first process flow according to the present disclosure for assembling a composite structure.
Figure 7:
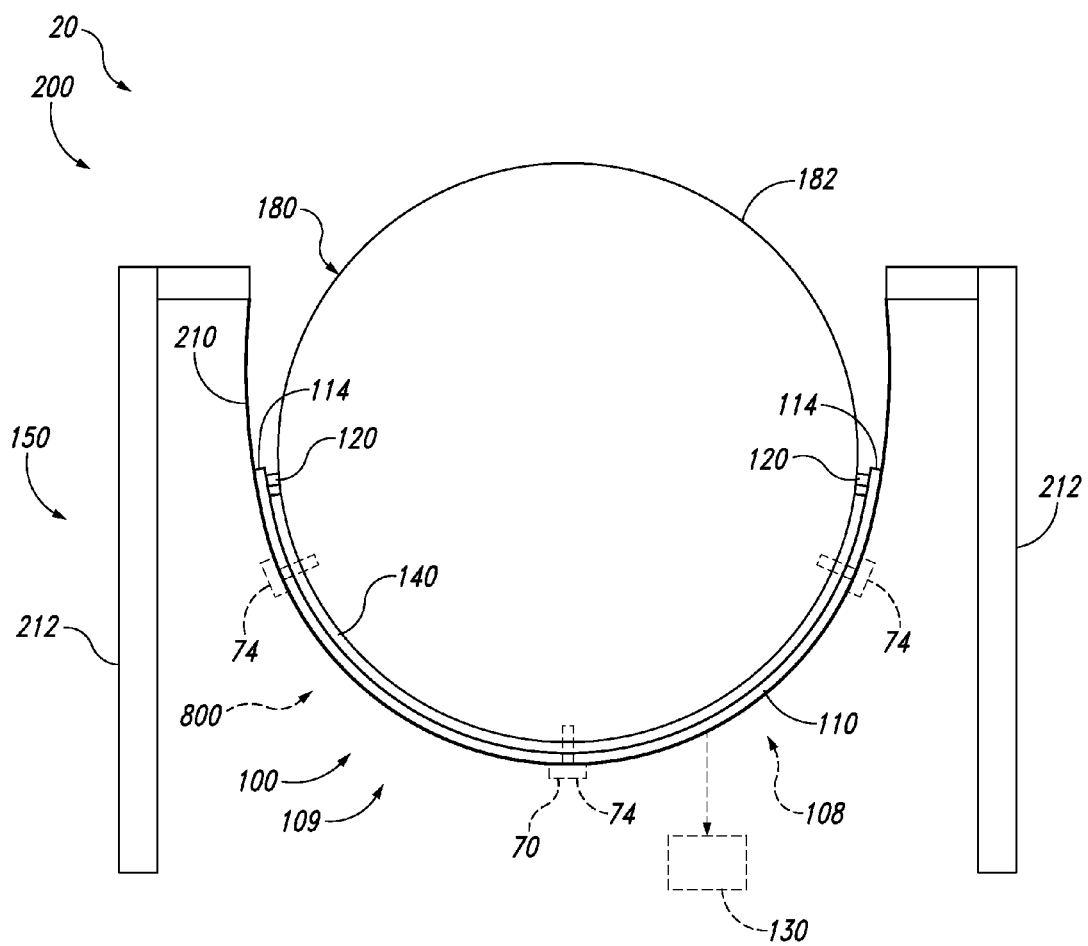
FIG. 7 is another schematic representation of the first process flow according to the present disclosure.

FIGS. 6-7 are schematic representations of a first process flow 200 according to the present disclosure for assembling a composite structure. In FIGS. 6-7, assembly deformation structure 150 includes a tether 210, which also may be referred to herein as a strap 210, that is configured to suspend composite-substrate assembly 100. Tether 210 may extend from a support structure 212 and composite-substrate assembly 100 may hang from tether 210 under the influence of gravity. It is within the scope of the present disclosure that composite-substrate assembly 100 may be formed prior to being suspended from tether 210 and may define a (substantially) planar initial conformation 106 (as illustrated in FIG. 4) and/or a non-planar initial conformation 106 (as illustrated in FIG. 5). Under these conditions, suspension of composite-substrate assembly 100 from tether 210 may transition composite-substrate assembly 100 to intermediate conformation 108. Additionally or alternatively, it is also within the scope of the present disclosure that composite-substrate assembly 100 may be formed while flexible substrate 110 is suspended from tether 210 and/or that, while suspended from tether 210, composite-substrate assembly 100 may define initial conformation 106.

Regardless, and as illustrated in FIGS. 6-7, tether 210 may be in contact with and/or may support flexible substrate 110 of composite-substrate assembly 100. This may include tether 210 contacting a side of flexible substrate 110 that is opposed to charge of composite material 140. Additionally or alternatively, flexible substrate 110 may define (or have) edges 114, and tether 210 may be operatively attached to edges 114 to suspend composite-substrate assembly 100.

As illustrated in FIG. 6, composite-substrate assembly 100 may be operatively located near and/or proximal to layup mandrel 180. Then, and as illustrated in FIG. 7, support structure 212 may be moved, layup mandrel 180 may be lowered, and/or a length of tether 210 may be decreased to tighten tether 210 around composite-substrate assembly 100 and draw charge of composite material 140 into contact with outer surface 182 of layup mandrel 180 such that composite-substrate assembly 100 is operatively located on layup mandrel 180. This may include compressing a sealing structure 120 between outer surface 182 and flexible substrate 110 to form a fluid seal therebetween and/or transitioning composite-substrate assembly 100 to intermediate conformation 108.

As illustrated in dashed lines in FIG. 7, one or more locating assemblies 70 may be utilized to locate and/or orient composite-substrate assembly 100 relative to layup mandrel 180. Additionally or alternatively, one or more retention structures 74 may be utilized to retain composite-substrate assembly on, proximal to, and/or in contact with layup mandrel 180. Furthermore, and as also illustrated in dashed lines in FIG. 7, a skin compaction assembly 130 may be utilized to apply a skin compaction vacuum to charge of composite material 140, thereby compacting charge of composite material 140 on layup mandrel 180 and/or transitioning composite-substrate assembly 100 to final conformation 109.

Then, and as illustrated in FIG. 14, flexible substrate 110 may be separated from charge of composite material 140, leaving charge of composite material 140 on outer surface 182 of layup mandrel 180. This may include releasing a retention vacuum that is applied between flexible substrate 110 and charge of composite material 140, as discussed in more detail herein, and charge of composite material 140 then may define at least a portion of a non-planar skin 790 of composite structure 800.

Figure 8:
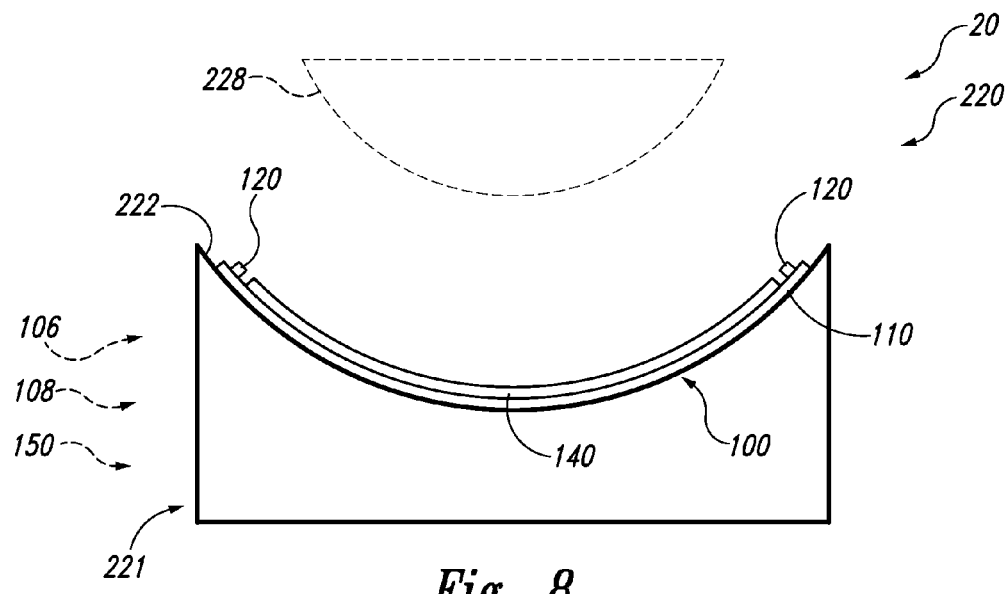
FIG. 8 is a schematic representation of a second process flow according to the present disclosure for assembling a composite structure.
Figure 9:
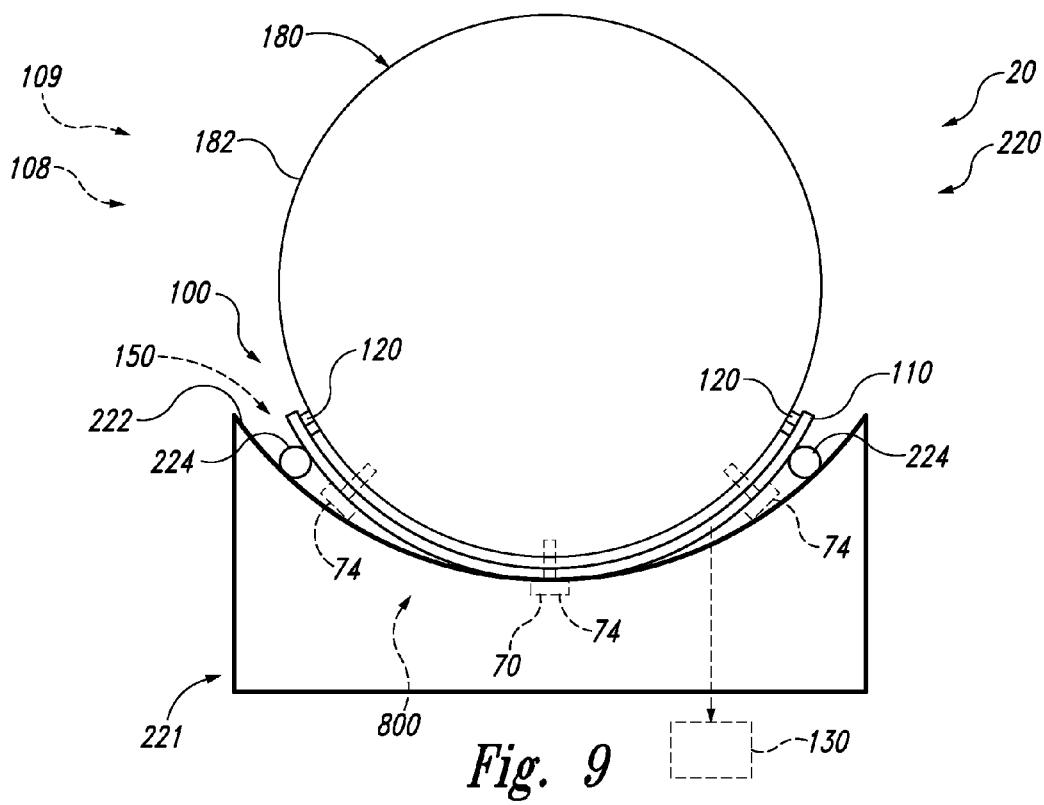
FIG. 9 is another schematic representation of the second process flow according to the present disclosure.

FIGS. 8-9 are schematic representations of a second process flow 220 according to the present disclosure for assembling a composite structure 800. In FIG. 8, a composite-substrate assembly 100 that includes a flexible substrate 110 and a charge of composite material 140 is operatively located on and/or supported by a non-planar transfer tool 221 that defines a non-planar surface 222, with flexible substrate 110 extending between charge of composite material 140 and non-planar surface 222. Subsequently, and as illustrated in FIG. 9, one or more deformation structures 224 may be actuated. This may deform composite-substrate assembly 100 and/or urge composite-substrate assembly 100 into contact with an outer surface 182 of a layup mandrel 180. Additionally or alternatively, this also may compress a sealing structure 120 between flexible substrate 110 and outer surface 182, forming a fluid seal therebetween. As an illustrative, non-exclusive example, deformation structures 224 may include and/or be deformation bladders 224 that may be configured to be inflated and to thereby deform composite-substrate assembly 100.

Similar to process flow 200 of FIGS. 6-7, and as illustrated in dashed lines in FIG. 9, a locating assembly 70 and/or a retention structure 74 may be utilized to located composite-substrate assembly 100 relative to layup mandrel 180 and/or to retain composite-substrate assembly 100 on layup mandrel 180, respectively. Additionally or alternatively, a skin compaction assembly 130 may apply a compaction vacuum to compact charge of composite material 140 on outer surface 182. Then, flexible substrate 110 may be separated from charge of composite material 140, leaving charge of composite material 140 on outer surface 182 of layup mandrel 180 (as illustrated in FIG. 14). This may include releasing a retention vacuum that is applied between flexible substrate 110 and charge of composite material 140, as discussed in more detail herein.

It is within the scope of the present disclosure that flexible substrate 110 may be located on non-planar surface 222 prior to being operatively attached to charge of composite material 140. As such, FIG. 8 may illustrate (and/or non-planar surface 222 may define) initial conformation 106 for composite-substrate assembly 100. Under these conditions, composite structure manufacturing apparatus 20 further may include a conveyance tool 228 that is configured to locate charge of composite material 140 on flexible substrate 110. As an illustrative, non-exclusive example, conveyance tool 228 may include and/or be a flexible vacuum chuck, illustrative, non-exclusive examples of which are disclosed in U.S. patent application Ser. No. 13/887,006, which has been incorporated by reference herein. In addition, deformation bladders 224 may function as assembly deformation structure 150 and may be configured to be inflated to deform composite-substrate assembly 100 from initial conformation 106 to intermediate conformation 108, with deformation from intermediate conformation 108 to final conformation 109 being accomplished during compaction of charge of composite material 140 on outer surface 182.

Additionally or alternatively, it is also within the scope of the present disclosure that composite-substrate assembly 100 may be formed in initial conformation 106 prior to being located on non-planar surface 222. Under these conditions, non-planar transfer tools 221 may function as assembly deformation structure 150 and locating composite-substrate assembly 100 on non-planar surface 222 may deform composite-substrate assembly 100 to intermediate conformation 108. Subsequently, deformation from intermediate conformation 108 to final conformation 109 may be accomplished during inflation of deformation bladder 224 and/or during compaction of charge of composite material 140 on outer surface 182.

Figure 10:
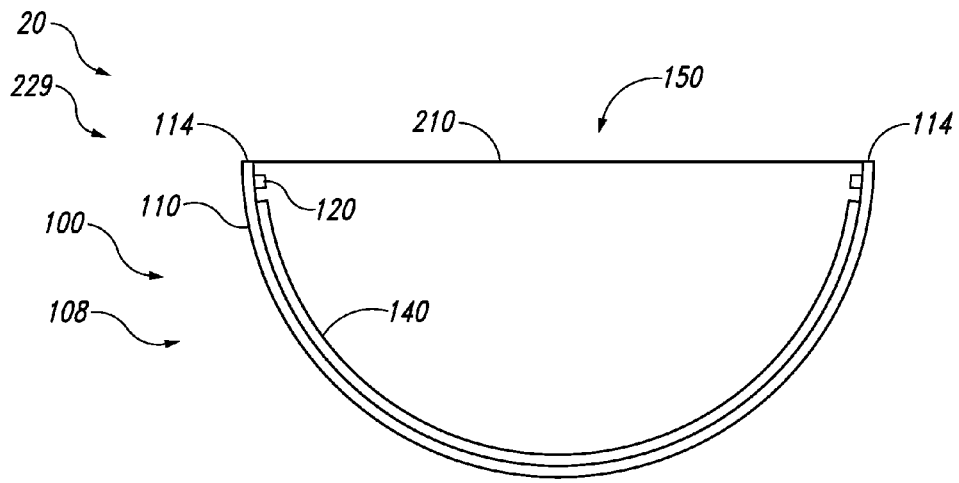
FIG. 10 is a schematic representation of a third process flow according to the present disclosure for assembling a composite structure.
Figure 11:
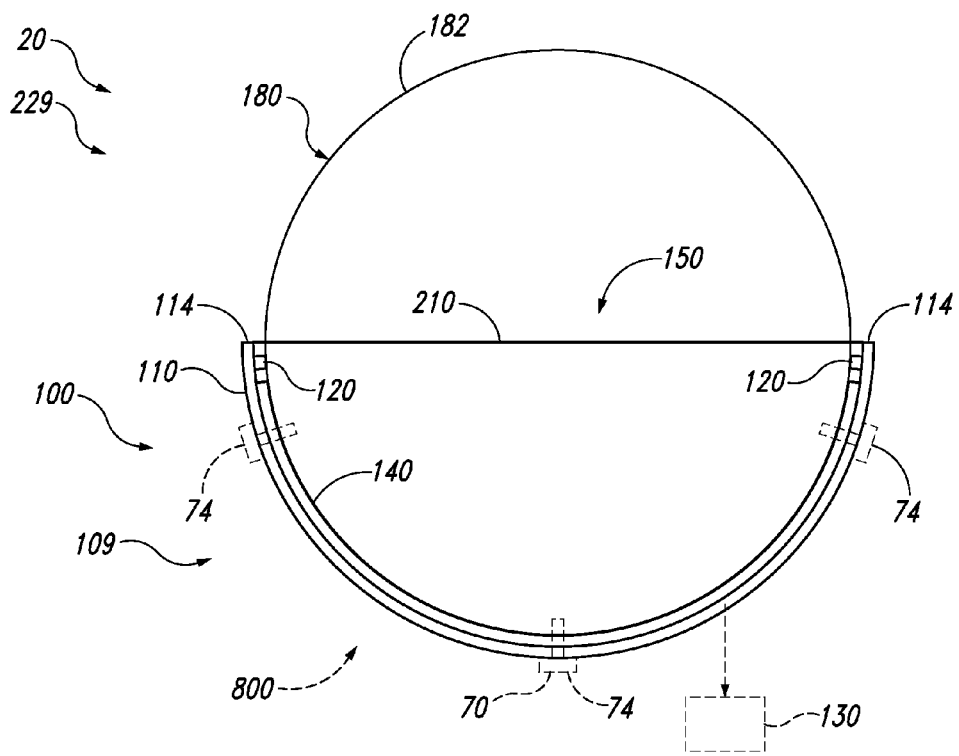
FIG. 11 is another schematic representation of the third process flow according to the present disclosure.

FIGS. 10-11 are schematic representations of a third process flow 229 according to the present disclosure for assembling a composite structure 800. In FIGS. 10-11, a composite-substrate assembly 100 includes a flexible substrate 110 and a charge of composite material 140 that is operatively attached thereto. Flexible substrate 110 defines edges 114 and assembly deformation structure 150 includes a tether 210 that extends between edges 114 and is configured to urge a first edge 114 and a second edge 114 toward one another to define intermediate configuration 108 of composite-substrate assembly 100. Subsequently, and as illustrated in FIG. 11, the composite-substrate assembly may be operatively located relative to, near, and/or on an outer surface 182 of a mandrel 180. Then, tether 210 may be tightened, bringing charge of composite material 140 into contact with outer surface 182 and/or compressing a sealing structure 120 between outer surface 182 and flexible substrate 110 to form a fluid seal therebetween.

Similar to process flow 200 of FIGS. 6-7, and as illustrated in dashed lines in FIG. 11, a locating assembly 70 and/or a retention structure 74 may be utilized to locate composite-substrate assembly 100 relative to layup mandrel 180 and/or to retain composite-substrate assembly 100 on layup mandrel 180, respectively. Additionally or alternatively, a skin compaction assembly 130 may apply a compaction vacuum to compact charge of composite material 140 on outer surface 182 to define final conformation 109 of composite-substrate assembly 100. Then, flexible substrate 110 may be separated from charge of composite material 140, leaving charge of composite material 140 on outer surface 182 of layup mandrel 180 (as illustrated in FIG. 14). This may include releasing a retention vacuum that is applied between flexible substrate 110 and charge of composite material 140, as discussed in more detail herein.

Figure 12:
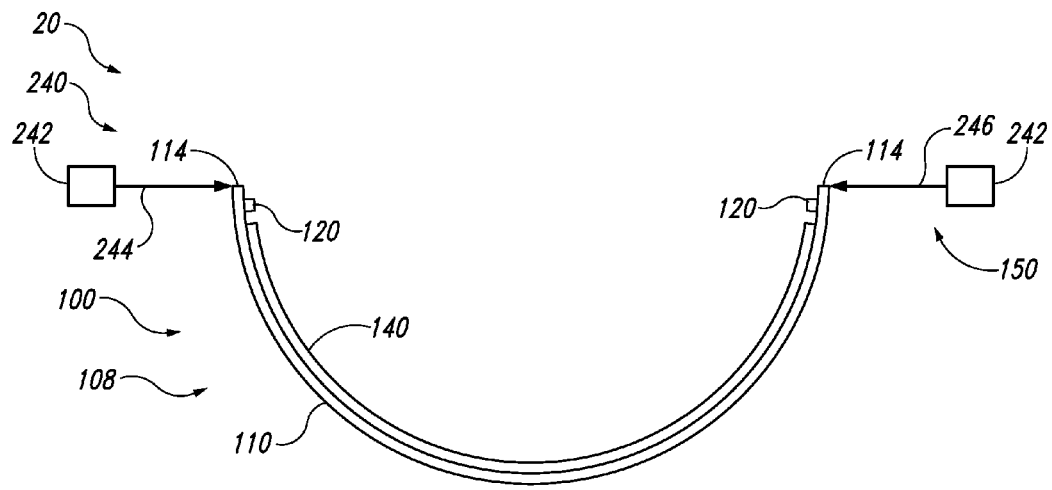
FIG. 12 is a schematic representation of a fourth process flow according to the present disclosure for assembling a composite structure.
Figure 13:
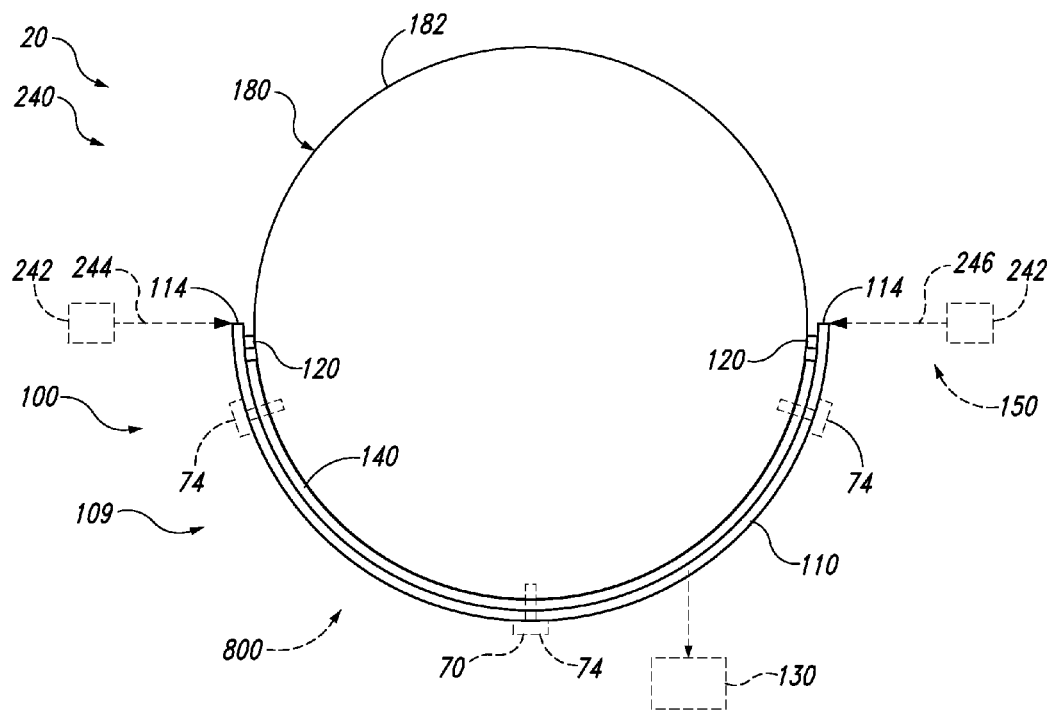
FIG. 13 is another schematic representation of the fourth process flow.
Figure 14:
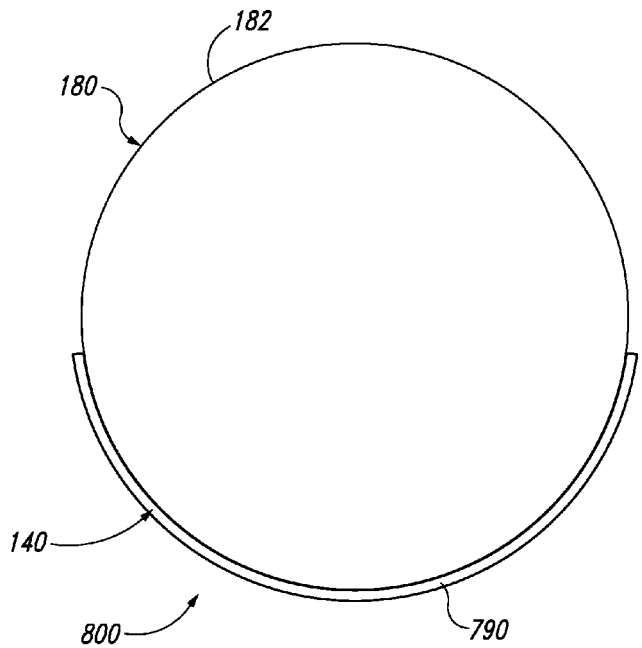
FIG. 14 is a schematic representation of a non-planar skin of a composite structure that is formed from a charge of composite material and is operatively attached to a layup mandrel.

FIGS. 12-13 are schematic representations of a fourth process flow 240 according to the present disclosure for assembling a composite structure 800. In FIGS. 12-13, a composite-substrate assembly 100 includes a flexible substrate 110 and a charge of composite material 140 that is operatively attached thereto. Flexible substrate 110 defines edges 114 and assembly deformation structure 150 includes an external force generation structure 242 that is configured to direct a first external force 244 toward a first edge 114 of flexible substrate 110 and also to direct a second external force 246 toward a second edge 114 of flexible substrate 110 to urge the first and second edges 114 toward one another to define intermediate conformation 108 of composite-substrate assembly 100. In addition, and as illustrated in FIG. 13, the composite-substrate assembly may be operatively located relative to, near, and/or on an outer surface 182 of a mandrel 180. Then, first external force 244 and/or second external force 246 may be increased, bringing charge of composite material 140 into contact with outer surface 182 and/or compressing a sealing structure 120 between outer surface 182 and flexible substrate 110 to form a fluid seal therebetween.

Similar to process flow 200 of FIGS. 6-7, and as illustrated in dashed lines in FIG. 13, a locating assembly 70 and/or a retention structure 74 may be utilized to locate composite-substrate assembly 100 relative to layup mandrel 180 and/or to retain composite-substrate assembly 100 on layup mandrel 180, respectively. Additionally or alternatively, a skin compaction assembly 130 may apply a compaction vacuum to compact charge of composite material 140 on outer surface 182 to define final conformation 109 of composite-substrate assembly 100. Then, flexible substrate 110 may be separated from charge of composite material 140, leaving charge of composite material 140 on outer surface 182 of layup mandrel 180 (as illustrated in FIG. 14). This may include releasing a retention vacuum that is applied between flexible substrate 110 and charge of composite material 140, as discussed in more detail herein.

Figure 15:
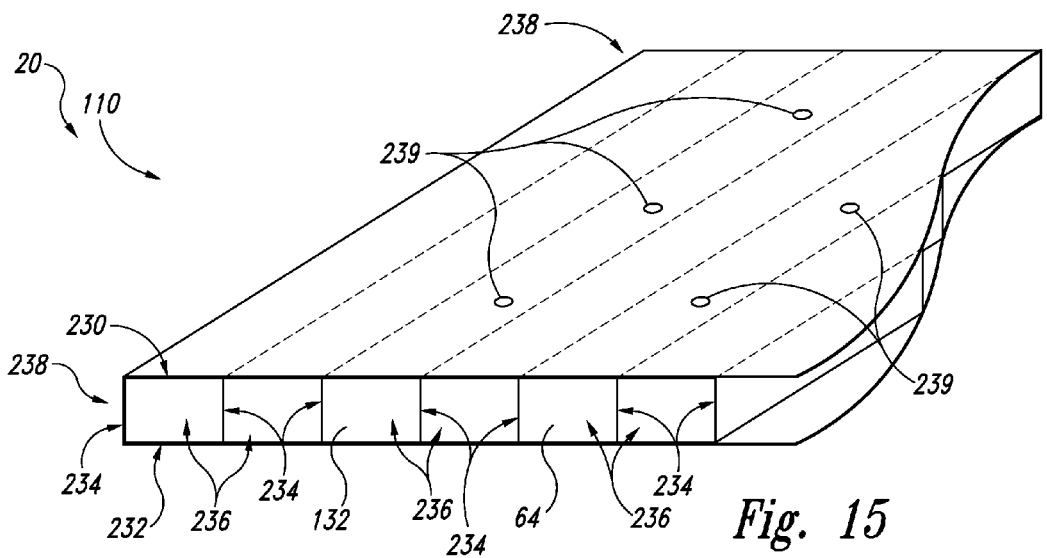
FIG. 15 is a less schematic but still illustrative, non-exclusive example of a flexible substrate that may be utilized with and/or included in the systems and methods according to the present disclosure.

FIG. 15 is a less schematic but still illustrative, non-exclusive example of a flexible substrate 110 that may be utilized with and/or included in the systems and methods according to the present disclosure, and flexible substrate 110 of FIG. 15 may be utilized with any of the composite structure manufacturing apparatus 20 that are disclosed herein with reference to any of FIGS. 3-14. Flexible substrate 110 of FIG. 15 includes a first planar wall 230, a second, opposed planar wall 232, and a plurality of elongate webs 234 that extend between first planar wall 230 and second planar wall 232. Planar walls 230 and 232, together with the plurality of elongate webs 234, define a plurality of elongate channels 236 that extend within flexible substrate 110. As illustrated, elongate channels 236 may be in fluid communication with a plurality of air holes 239, which may provide fluid communication between elongate channels 236 and interface 102 when charge of composite material 140 is operatively attached to flexible substrate 110 (as illustrated in FIG. 4). Thus, a portion of air holes 239, together with one or more elongate channels 236 may function as (or define at least a portion of) retention vacuum manifold 64. Similarly, a different portion of air holes 239, together with one or more other elongate channels 236, may function as (or define at least a portion of) compaction vacuum manifold 132.

It is within the scope of the present disclosure that channels 236 may extend along a longitudinal axis that is parallel to first planar wall 230 and/or second planar wall 232, may extend from an edge 238 of flexible substrate 110, may extend from a first edge 238 of flexible substrate 110 to a second edge 238 of flexible substrate 110, and/or may extend between two opposed edges 238 of flexible substrate 110.

Figure 16:
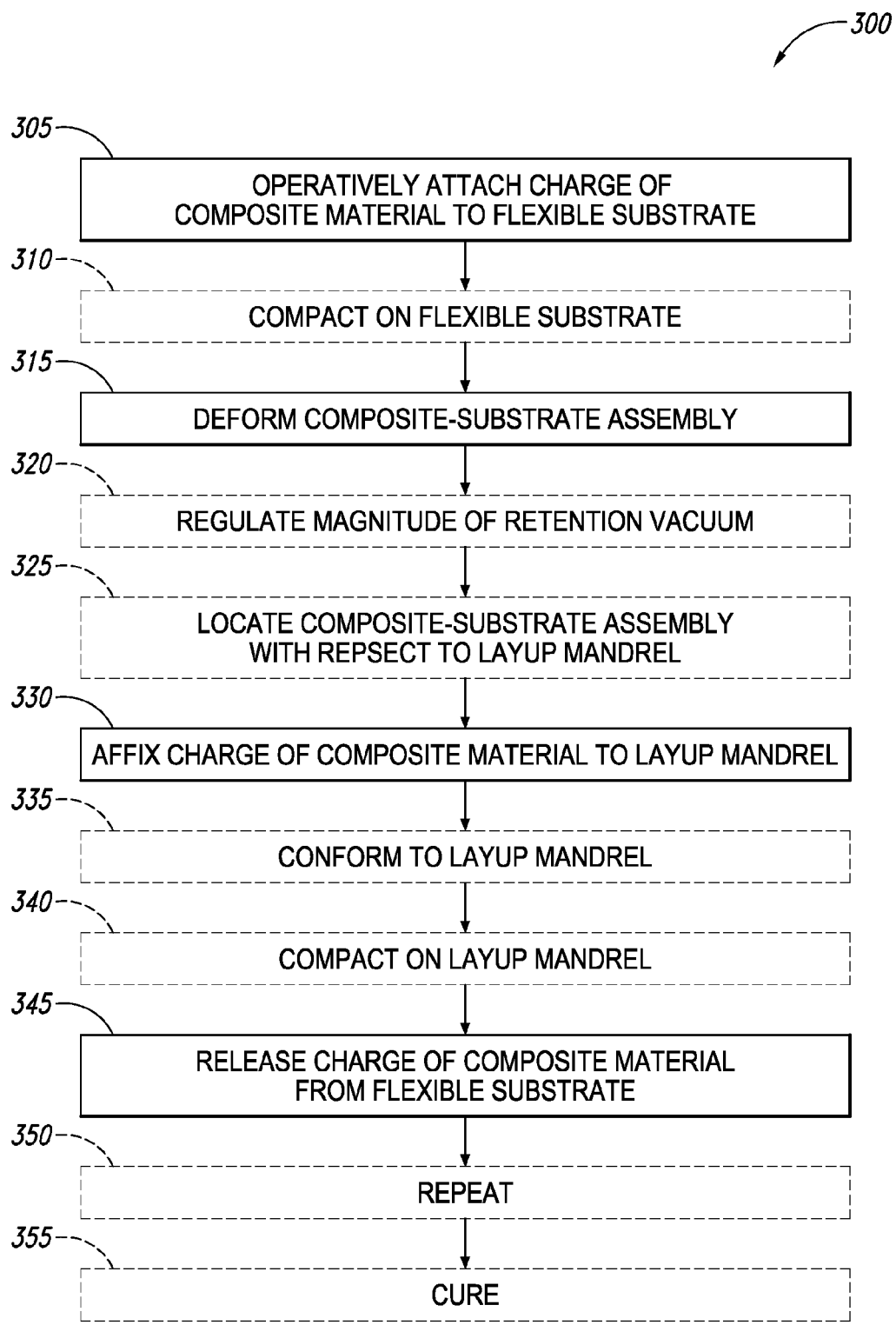
FIG. 16 is a flowchart depicting methods according to the present disclosure of assembling a skin of a composite structure on an outer surface of a layup mandrel.

FIG. 16 is a flowchart depicting methods 300 according to the present disclosure of assembling a skin of a composite structure on an outer surface of a layup mandrel. Methods 300 include operatively attaching a charge of composite material to a flexible substrate to form a composite-substrate assembly at 305 and may include compacting the charge of composite material on the flexible substrate at 310. Methods 300 further include deforming the composite-substrate assembly at 315 and may include regulating a magnitude of a retention vacuum that retains the charge of composite material on the flexible substrate at 320 and/or locating the composite-substrate assembly with respect to a layup mandrel at 325. Methods 300 further include affixing the charge of composite material to the layup mandrel at 330 and may include conforming a component of the composite-substrate assembly to the layup mandrel at 335 and/or compacting the charge of composite material on the layup mandrel at 340. Methods 300 further include releasing the charge of composite material from the flexible substrate at 345 and may include repeating the methods at 350 and/or curing the charge of composite material at 355.

Operatively attaching the charge of composite material to the flexible substrate to form the composite-substrate assembly at 305 may include operatively attaching any suitable charge of composite material to any suitable flexible substrate in any suitable manner to form and/or define an initial conformation for the composite-substrate assembly. Illustrative, non-exclusive examples of the charge of composite material, the flexible substrate, and the initial conformation for the composite-substrate assembly are disclosed herein.

As an illustrative, non-exclusive example, the operatively attaching at 305 may include laying up a plurality of plies of composite material on the flexible substrate and/or sequentially attaching the plurality of plies of composite material to the flexible substrate to form the charge of composite material. As another illustrative, non-exclusive example, the operatively attaching also may include simultaneously attaching the plurality of plies of composite material to the flexible substrate to form the charge of composite material.

As yet another illustrative, non-exclusive example, the operatively attaching at 305 also may include applying a retention vacuum between the charge of composite material and the flexible substrate, such as via a retention vacuum manifold that is defined, at least in part, by the flexible substrate. When the operatively attaching at 305 includes applying the retention vacuum, methods 300 further may include maintaining the retention vacuum during the deforming at 315.

It is within the scope of the present disclosure that the operatively attaching at 305 may be performed in any suitable sequence during methods 300. As illustrative, non-exclusive examples, the operatively attaching at 305 may be performed prior to the deforming at 315, prior to the affixing at 330, and/or prior to the releasing at 345.

Compacting the charge of composite material on (or onto) the flexible substrate at 310 may include compacting the charge of composite material in any suitable manner. As illustrative, non-exclusive examples, the compacting at 310 may include compressing the charge of composite material, decreasing a volume of the charge of composite material, pressing the charge of composite material onto the flexible substrate, and/or increasing an adhesive force between the charge of composite material and the flexible substrate. As a more specific but still illustrative, non-exclusive example, the compacting at 310 also may include vacuum bagging the charge of composite material on the flexible substrate and/or utilizing a vacuum chuck to compact the charge of composite material on the flexible substrate. It is within the scope of the present disclosure that the compacting at 310 may be performed in any suitable sequence during methods 300. As an illustrative, non-exclusive example, the compacting at 310 may be subsequent to the operatively attaching at 305. As another illustrative, non-exclusive example, the compacting at 310 may be prior to the deforming at 315.

Deforming the composite-substrate assembly at 315 may include deforming the composite-substrate assembly to an intermediate conformation that is different from the initial conformation, with illustrative, non-exclusive examples of the intermediate conformation being discussed herein. As an illustrative, non-exclusive example, the deforming at 315 may include deforming such that the composite-substrate assembly includes, or defines, a concave side and an opposed convex side. Under these conditions, the charge of composite material may be located on and/or form at least a portion of the concave side, while the flexible substrate may be located on and/or form at least a portion of the convex side.

It is within the scope of the present disclosure that the composite-substrate assembly may be oriented in any suitable relative orientation during the deforming at 315. As illustrative, non-exclusive examples, the deforming at 315 may include orienting the composite-substrate assembly such that the concave side faces in a (substantially) vertical direction, in a (substantially) horizontal direction, in a (substantially) upward direction, and/or in a (substantially) downward direction.

The deforming at 315 may be accomplished in any suitable manner. As an illustrative, non-exclusive example, the deforming at 315 may include applying a deformation force to the composite-substrate assembly. Illustrative, non-exclusive examples of the deformation force include any suitable mechanically applied force, pressure force, pneumatic force, hydraulic force, and/or vacuum force. As another illustrative, non-exclusive example, the flexible substrate may define a first edge and a second edge that is (substantially) opposed to the first edge and the deforming at 315 may include urging the first edge toward the second edge. As yet another illustrative, non-exclusive example, the deforming at 315 further may include heating the charge of composite material during the deforming, heating the charge of composite material to accelerate the deforming, and/or heating the charge of composite material to produce, or generate, the deforming.

It is within the scope of the present disclosure that the deforming at 315 may be performed in any suitable sequence during methods 300. As an illustrative, non-exclusive example, the deforming at 315 may be prior to the affixing at 330. As another illustrative, non-exclusive example, the deforming at 315 may be prior to the releasing at 345.

As a more specific but still illustrative, non-exclusive example, the deforming at 315 may include suspending the composite-substrate assembly from a tether (or from a plurality of tethers) and deforming the composite-substrate assembly under, or by, the influence of gravity. Under these conditions, the affixing at 330 and/or the conforming at 335 further may include locating the composite-substrate assembly proximal to the layup mandrel and/or tightening the tether such that the charge of composite material is drawn into contact with the outer surface of the layup mandrel and/or such that the charge of composite material is conformed to the outer surface of the layup mandrel.

As another more specific but still illustrative, non-exclusive example, the deforming at 315 also may include inflating a deformation bladder that is located between the flexible substrate and a non-planar surface of a non-planar transfer tool. This may direct and/or urge the composite-substrate assembly from the initial conformation to the intermediate conformation and/or may urge the charge of composite material into contact with the outer surface of the layup mandrel.

As yet another more specific but still illustrative, non-exclusive example, the flexible substrate may define a first edge and a second edge that is (substantially) opposed to the first edge and the deforming at 315 may include urging the first edge and the second edge toward one another to define the intermediate conformation. As an illustrative, non-exclusive example, the urging may include extending a tether between the first edge and the second edge to provide a motive force for the urging. As another illustrative, non-exclusive example, the urging also may include directing a first external force toward the first edge and concurrently directing a second (opposed) external force toward the second edge.

When the operatively attaching at 305 includes applying the retention vacuum, methods 300 further may include regulating the magnitude of the retention vacuum that retains the charge of composite material on the flexible substrate at 320. The regulating at 320 may include regulating to control a motion (or slipping) of the charge of composite material and the flexible substrate relative to one another during the deforming at 315. This may include increasing a magnitude of the retention vacuum to decrease the motion (or slipping) and/or decreasing the magnitude of the retention vacuum to increase the motion (or slipping).

Locating the composite-substrate assembly with respect to the layup mandrel at 325 may include indexing, aligning, precisely aligning, and/or accurately aligning the composite-substrate assembly relative to the layup mandrel. Additionally or alternatively, the locating at 325 also may include locating the composite-substrate assembly and the layup mandrel proximal to, near, and/or within a threshold distance of one another. As an illustrative, non-exclusive example, the locating at 325 may include inserting one or more pins through the composite-substrate assembly (or the flexible substrate thereof) and into the layup mandrel (i.e., pinning the composite-substrate assembly to the layup mandrel) to orient the composite-substrate assembly relative to the layup mandrel and/or to retain the composite-substrate assembly on the layup mandrel. This may include pinning the composite-substrate assembly to the layup mandrel subsequent to the deforming at 315 and/or during the affixing at 330.

Affixing the charge of composite material to the layup mandrel at 330 may include affixing the charge of composite material to an outer surface of the layup mandrel and may be performed prior to the releasing at 345. As an illustrative, non-exclusive example, the affixing at 330 may include locating the charge of composite material between the flexible substrate and the layup mandrel. As another illustrative, non-exclusive example, the affixing at 330 also may include adhering the charge of composite material to the outer surface of the layup mandrel, such as with an adhesive. As yet another illustrative, non-exclusive example, the affixing at 330 further may include establishing direct contact, mechanical contact, and/or physical contact between the charge of composite material (or a side thereof) and the outer surface of the layup mandrel and/or producing an interface between the charge of composite material and the layup mandrel. As another illustrative, non-exclusive example, the affixing at 330 also may include compressing the charge of composite material against the outer surface of the layup mandrel. As yet another illustrative, non-exclusive example, methods 300 further may include locating a stiffening element, such as a stringer, within a stiffening element recess of the layup mandrel. Under these conditions, the affixing at 330 may include affixing the charge of composite material (at least partially) to the stiffening element.

Conforming the component of the composite-substrate assembly to the layup mandrel at 335 may include conforming any suitable component and/or element of the composite-substrate assembly to the layup mandrel. As an illustrative, non-exclusive example, the conforming at 335 may include conforming the charge of composite material (and/or a surface thereof) to the outer surface of the layup mandrel and/or to a contour of the outer surface of the layup mandrel. As another illustrative, non-exclusive example, the conforming at 335 also may include conforming the flexible substrate (and/or a surface thereof) to the outer surface of the layup mandrel and/or to the contour of the outer surface of the layup mandrel.

Compacting the charge of composite material on the layup mandrel at 340 may include compacting the charge of composite material in any suitable manner and/or for any suitable compaction time. As an illustrative, non-exclusive example, the compacting at 340 may include applying a compaction vacuum between the flexible substrate and the outer surface of the layup mandrel. This may include applying the compaction vacuum with a compaction vacuum manifold that is (at least partially) defined by the flexible substrate. Illustrative, non-exclusive examples of the compaction time include compaction times of at least 1 minute, at least 2 minutes, at least 3 minutes, at least 4 minutes, at least 5 minutes, at least 10 minutes, at least 15 minutes, or at least 20 minutes. Additional illustrative, non-exclusive examples of the compaction time include compaction times of less than 120 minutes, less than 115 minutes, less than 90 minutes, less than 75 minutes, less than 60 minutes, less than 45 minutes, less than 30 minutes, less than 15 minutes, or less than 10 minutes.

Releasing the charge of composite material from the flexible substrate at 345 may include releasing in any suitable manner. As an illustrative, non-exclusive example, the releasing at 345 may include releasing the charge of composite material from the flexible substrate while retaining the charge of composite material on (or attached to) the outer surface of the layup mandrel. As another illustrative, non-exclusive example, the releasing at 345 also may include separating the charge of composite material from the flexible substrate, such as by separating at the interface between the charge of composite material and the flexible substrate. As yet another illustrative, non-exclusive example, and when the operatively attaching at 305 includes applying the retention vacuum, the releasing at 345 also may include ceasing the retention vacuum.

Repeating the methods at 350 may include repeating any suitable portion of methods 300 any suitable number of times. As an illustrative, non-exclusive example, the charge of composite material may be a first charge of composite material and the repeating at 350 may include repeating at least the operatively attaching at 305, the deforming at 315, the affixing at 330, and the releasing at 345 a plurality of times to affix and/or to retain a respective plurality of charges of composite material on the outer surface of the layup mandrel and/or to define the (entire) skin for the composite structure.

Curing the charge of composite material at 355 may include curing the charge of composite material on the layup mandrel in any suitable manner. This may include curing the charge of composite material to generate and/or produce the skin of the composite structure. As an illustrative, non-exclusive example, the curing at 355 may include applying heat and/or pressure to the charge of composite material. As additional illustrative, non-exclusive examples, the curing at 355 also may include locating the layup mandrel and the charge of composite material within a curing oven, directing a heat lamp toward the charge of composite material, and/or covering the charge of composite material with a heat blanket.

Figure 17:
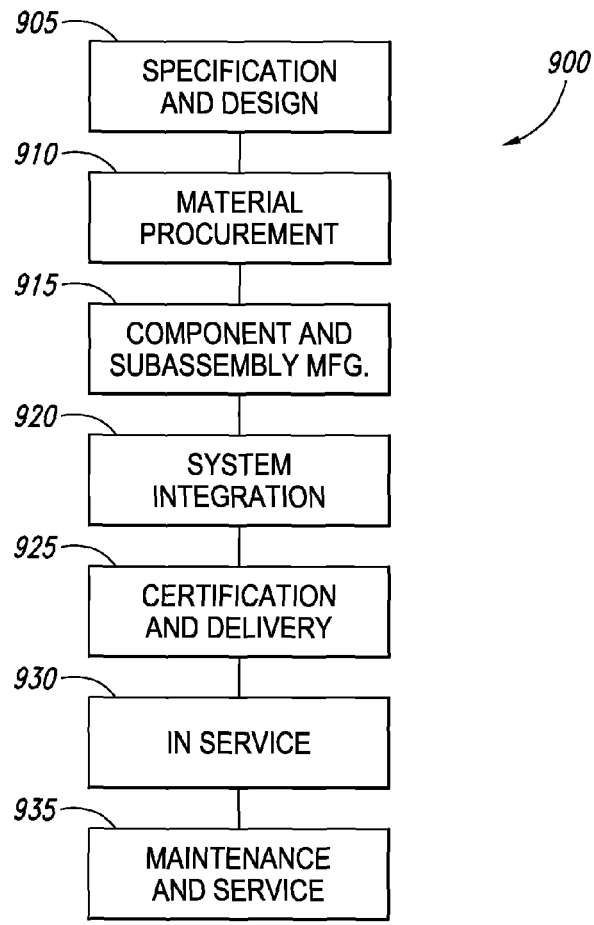
FIG. 17 is a flow diagram of aircraft production and service methodology.
Figure 18:
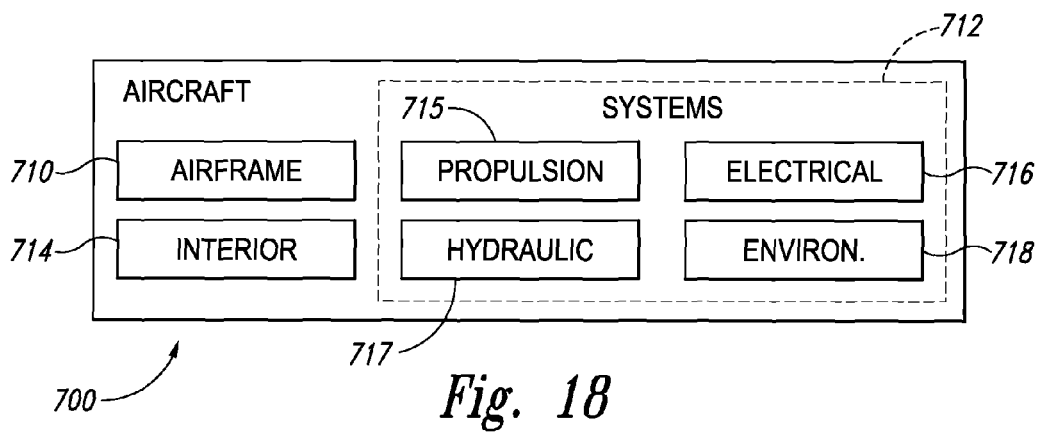
FIG. 18 is a block diagram of an aircraft.

Referring now to FIGS. 17-18, embodiments of the disclosure may be described in the context of an aircraft manufacturing and service method 900, as shown in FIG. 17, and an aircraft 700, as shown in FIG. 18. During pre-production, exemplary method 900 may include specification and design 905 of the aircraft 700 and material procurement 910. During production, component and subassembly manufacturing 915 and system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 18, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A method of assembling a skin of a composite structure on an outer surface of a layup mandrel, the method comprising:

operatively attaching a charge of composite material to a flexible substrate to define an initial conformation for a composite-substrate assembly that includes the charge of composite material and the flexible substrate;

deforming the composite-substrate assembly to an intermediate conformation that is different from the initial conformation;

affixing the charge of composite material to the outer surface of the layup mandrel; and releasing the charge of composite material from the flexible substrate while retaining the charge of composite material on the outer surface of the layup mandrel.

A2. The method of paragraph A1, wherein the operatively attaching includes laying up a plurality of plies to form the charge of composite material on the flexible substrate, optionally with a layup tool.

A3. The method of any of paragraphs A1-A2, wherein the operatively attaching includes applying a retention vacuum between the charge of composite material and the flexible substrate, optionally with a retention vacuum manifold that is defined by the flexible substrate.

A4. The method of paragraph A3, wherein the method further includes maintaining the retention vacuum during the deforming to retain the charge of composite material on the flexible substrate.

A5. The method of any of paragraphs A3-A4, wherein the method further includes regulating a magnitude of the retention vacuum during the deforming to control a relative motion (or slipping) between the charge of composite material and the flexible substrate during the deforming.

A6. The method of any of paragraphs A1-A5, wherein the operatively attaching includes vacuum bagging the charge of composite material on the flexible substrate.

A7. The method of any of paragraphs A1-A6, wherein the charge of composite material comprises a plurality of composite plies, and optionally wherein the operatively attaching includes at least one of simultaneously attaching the plurality of composite plies to the flexible substrate and sequentially attaching the plurality of composite plies to the flexible substrate.

A8. The method of any of paragraphs A1-A7, wherein the operatively attaching includes operatively attaching the charge of composite material to a surface of the flexible substrate to define an interface between the flexible substrate and the charge of composite material.

A9. The method of any of paragraphs A1-A8, wherein the deforming includes deforming such that the composite-substrate assembly defines a concave side and an opposed convex side.

A10. The method of paragraph A9, wherein the deforming includes deforming such that the charge of composite material is located on the concave side of the composite-substrate assembly.

A11. The method of any of paragraphs A9-A10, wherein the deforming includes deforming such that the flexible substrate is located on the convex side of the composite-substrate assembly.

A12. The method of any of paragraphs A9-A11, wherein the method further includes orienting the composite-substrate assembly such that the concave side faces in at least one of a (substantially) vertical direction, a (substantially) horizontal direction, a (substantially) upward direction, and a (substantially) downward direction.

A13. The method of any of paragraphs A1-A12, wherein the deforming includes applying a deformation force to the composite-substrate assembly.

A14. The method of paragraph A13, wherein the deformation force is at least one of (i) a gravitational force, (ii) a mechanically applied force, (iii) a pressure force, (iv) a pneumatic force, (v) a hydraulic force, and (vi) a vacuum force.

A15. The method of any of paragraphs A1-A14, wherein the flexible substrate defines a first edge and a second edge that is (substantially) opposed to the first edge, and further wherein the deforming includes urging the first edge toward the second edge.

A16. The method of any of paragraphs A1-A15, wherein the method further includes heating the charge of composite material at least one of (i) during the deforming, (ii) to accelerate the deforming, and (iii) to produce the deforming.

A17. The method of any of paragraphs A1-A16, wherein the deforming includes suspending the composite-substrate assembly from a tether, optionally from a plurality of tethers, and further optionally wherein the tether includes, or is, a strap.

A18. The method of paragraph A17, wherein the suspending includes contacting the tether with a side of the flexible substrate that is opposed to the charge of composite material.

A19. The method of any of paragraphs A17-A18, wherein the flexible substrate defines a/the first edge and a/the second edge that is (substantially) opposed to the first edge, and further wherein the suspending includes suspending from the first edge and the second edge, optionally by attaching the tether to the first edge and the second edge.

A20. The method of any of paragraphs A17-A19, wherein the method further includes conforming the composite-substrate assembly to the outer surface of the layup mandrel to define a target conformation for the charge of composite material that corresponds to a conformation of the skin of the composite structure, wherein the conforming includes tightening the tether to draw the charge of composite material into contact with the outer surface of the layup mandrel.

A21. The method of paragraph A20, wherein the method further includes pinning the composite-substrate assembly to the layup mandrel during the conforming to retain the charge of composite material in contact with the outer surface of the layup mandrel.

A22. The method of any of paragraphs A1-A21, wherein, during the operatively attaching, the flexible substrate is located on a non-planar surface of a non-planar transfer tool, and further wherein the initial conformation corresponds to a surface profile of the non-planar surface of the non-planar transfer tool.

A23. The method of paragraph A22, wherein the flexible substrate is located between the charge of composite material and the non-planar surface of the non-planar transfer tool.

A24. The method of any of paragraphs A22-A23, wherein the method further includes pinning (a central portion of) the composite-substrate assembly to the layup mandrel, optionally prior to the deforming.

A25. The method of any of paragraphs A22-A24, wherein the deforming includes inflating a deformation bladder that is located between the flexible substrate and the non-planar surface of the non-planar transfer tool.

A26. The method of any of paragraphs A22-A25, wherein the deforming includes pinning a (subsequent) portion of the composite-substrate assembly to the layup mandrel.

A27. The method of any of paragraphs A1-A26, wherein the flexible substrate defines a/the first edge and a/the second edge that is (substantially) opposed to the first edge, and further wherein the deforming includes urging the first edge and the second edge toward one another to define the intermediate conformation.

A28. The method of paragraph A27, wherein the urging includes extending a tether between the first edge and the second edge to provide a motive force for the urging.

A29. The method of any of paragraphs A27-A28, wherein the urging includes directing a first external force toward the first edge and concurrently directing a second external force toward the second edge.

A30. The method of any of paragraphs A27-A29, wherein the method further includes pinning a (central) portion of the composite-substrate assembly to the layup mandrel, optionally subsequent to the deforming, optionally during the affixing, and further optionally to align the composite-substrate assembly with the layup mandrel.

A31. The method of any of paragraphs A1-A30, wherein the affixing includes locating the charge of composite material between the outer surface of the layup mandrel and the flexible substrate.

A32. The method of any of paragraphs A1-A31, wherein the affixing includes adhering the charge of composite material to the outer surface of the layup mandrel, optionally with an adhesive.

A33. The method of any of paragraphs A1-A32, wherein the affixing includes establishing (direct, mechanical, or physical) contact between a side of the charge of composite material and the outer surface of the layup mandrel, optionally to produce an interface between the charge of composite material and the outer surface of the layup mandrel.

A34. The method of any of paragraphs A1-A33, wherein the affixing includes compressing the charge of composite material against the outer surface of the layup mandrel.

A35. The method of any of paragraphs A1-A34, wherein the releasing includes separating the charge of composite material from the flexible substrate, optionally at an/the interface between the charge of composite material and the flexible substrate.

A36. The method of any of paragraphs A1-A35, wherein the releasing includes ceasing a/the retention vacuum between the charge of composite material and the flexible substrate.

A37. The method of any of paragraphs A1-A36, wherein the method further includes conforming the charge of composite material to at least one of the outer surface of the layup mandrel and a contour of the outer surface of the layup mandrel.

A38. The method of any of paragraphs A1-A37, wherein the method further includes conforming the flexible substrate to at least one of the outer surface of the layup mandrel and a/the contour of the outer surface of the layup mandrel.

A39. The method of any of paragraphs A1-A38, wherein the method further includes conforming the composite-substrate assembly to at least one of the outer surface of the layup mandrel and a/the contour of the outer surface of the layup mandrel.

A40. The method of any of paragraphs A1-A39, wherein, subsequent to the operatively attaching and prior to the deforming, the method further includes compacting the charge of composite material onto the flexible substrate.

A41. The method of any of paragraphs A1-A40, wherein, prior to the releasing, the method further includes compacting the charge of composite material on the outer surface of the layup mandrel.

A42. The method of any of paragraphs A1-A41, wherein the compacting the charge of composite material on the outer surface of the layup mandrel includes applying a compaction vacuum between the flexible substrate and the outer surface of the layup mandrel, optionally with a compaction vacuum manifold that is defined by the flexible substrate.

A43. The method of any of paragraphs A1-A42, wherein the method further includes pinning the composite-substrate assembly to the layup mandrel, optionally subsequent to the deforming, optionally during the affixing, and further optionally to align the composite-substrate assembly with the layup mandrel.

A44. The method of any of paragraphs A1-A43, wherein the charge of composite material is a first charge of composite material, and further wherein the method includes repeating at least the operatively attaching, the deforming, the affixing, and the releasing a plurality of times to retain a plurality of charges of composite material on the outer surface of the layup mandrel and define the skin for the composite structure.

A45. The method of any of paragraphs A1-A44, wherein, prior to the affixing, the method further includes locating a stiffening element within a stiffening element recess of the layup mandrel, wherein the affixing further includes affixing the charge of composite material to the stiffening element.

A46. The method of any of paragraphs A1-A45, wherein the operatively attaching is performed prior to at least one, optionally at least two, and further optionally all, of the deforming, the affixing, and the releasing.

A47. The method of any of paragraphs A1-A46, wherein the deforming is performed prior to at least one, and optionally both, of the affixing and the releasing.

A48. The method of any of paragraphs A1-A47, wherein the affixing is performed prior to the releasing.

A49. The method of any of paragraphs A1-A48, wherein the method further includes curing the charge of composite material on the layup mandrel to generate the skin of the composite structure.

A50. The method of any of paragraphs A1-A49, wherein the method includes performing the method using the apparatus of any of paragraphs B1-B30.

A51. The method of any of paragraphs A1-A50, wherein the method further includes locating the composite-substrate assembly and the layup mandrel proximal to one another, near one another, or within a threshold distance of one another, optionally subsequent to the deforming, and further optionally prior to the affixing.

B1. A composite structure manufacturing apparatus, comprising:
a flexible substrate that is configured to be operatively attached to a charge of composite material to form a composite-substrate assembly;
an assembly deformation structure that is configured to deform the composite-substrate assembly from an initial conformation to an intermediate conformation that is different from the initial conformation; and
a layup mandrel that defines an outer surface that is configured to receive the charge of composite material.

B2. The apparatus of paragraph B1, wherein the flexible substrate is operatively attached to the charge of composite material.

B3. The apparatus of paragraph B2, wherein the apparatus further includes the composite-substrate assembly.

B4. The apparatus of any of paragraphs B1-B3, wherein the flexible substrate defines a compaction vacuum manifold that is configured to apply a compaction vacuum between the flexible substrate and the outer surface of the layup mandrel to compact the charge of composite material on the outer surface of the layup mandrel when the composite-substrate assembly is operatively located on the layup mandrel.

B5. The apparatus of any of paragraphs B1-B4, wherein the assembly deformation structure is configured to deform the composite-substrate assembly such that the composite-substrate assembly defines a concave side and an opposed convex side.

B6. The apparatus of paragraph B5, wherein the charge of composite material is located on the concave side of the composite-substrate assembly.

B7. The apparatus of any of paragraphs B5-B6, wherein the flexible substrate is located on the convex side of the composite-substrate assembly.

B8. The apparatus of any of paragraphs B1-B7, wherein the assembly deformation structure includes a tether that is configured to suspend the composite-substrate assembly to transition the composite-substrate assembly from the initial conformation to the intermediate conformation, optionally wherein the tether includes, or is, a strap.

B9. The apparatus of paragraph B8, wherein the composite-substrate assembly is suspended from the tether.

B10. The apparatus of paragraph B9, wherein the tether is in contact with a side of the flexible substrate that is opposed to the charge of composite material.

B11. The apparatus of any of paragraphs B9-B10, wherein the flexible substrate defines a first edge and a second edge that is (substantially) opposed to the first edge, and further wherein the tether is attached to the first edge and to the second edge to suspend the composite-substrate assembly.

B12. The apparatus of any of paragraphs B8-B11, wherein the tether is further configured to be tightened around the composite-substrate assembly to draw the charge of composite material into contact with the outer surface of the layup mandrel when the composite-substrate assembly is operatively located on the layup mandrel.

B13. The apparatus of paragraph B12, wherein the assembly deformation structure further includes a support structure that is configured to support the tether.

B14. The apparatus of any of paragraphs B1-B13, wherein the apparatus further includes a non-planar transfer tool that defines a non-planar surface, wherein the composite-substrate assembly is located on the non-planar surface, and further wherein the flexible substrate extends between the charge of composite material and the non-planar surface.

B15. The apparatus of paragraph B14, wherein the non-planar surface defines the initial conformation.

B16. The apparatus of any of paragraphs B14-B15, wherein the apparatus further includes a conveyance tool that is configured to locate the charge of composite material on the non-planar surface, optionally wherein the conveyance tool includes a flexible vacuum chuck.

B17. The apparatus of any of paragraphs B14-B16, wherein the apparatus further includes a deformation bladder that is located between the flexible substrate and the non-planar surface, wherein the deformation bladder is configured to be inflated to deform the composite-substrate assembly from the initial conformation to the intermediate conformation when the composite-substrate assembly is operatively located to transfer the charge of composite material to the outer surface of the layup mandrel.

B18. The apparatus of any of paragraphs B1-B17, wherein the flexible substrate defines a/the first edge and a/the second edge that is (substantially) opposed to the first edge, and further wherein the assembly deformation structure is configured to urge the first edge and the second edge toward one another to define the intermediate conformation.

B19. The apparatus of paragraph B18, wherein the assembly deformation structure includes an external force generation structure that is configured to direct a first external force toward the first edge and to direct a second external force toward the second edge to urge the first edge and the second edge toward one another.

B20. The apparatus of any of paragraphs B18-B19, wherein the assembly deformation structure includes a tether that extends between the first edge and the second edge to urge the first edge and the second edge toward one another.

B21. The apparatus of any of paragraphs B1-B20, wherein the apparatus further includes an interfacial force control assembly that is configured to regulate an interfacial force that is applied between the charge of composite material and the flexible substrate to retain the charge of composite material on the flexible substrate.

B22. The apparatus of paragraph B21, wherein the interfacial force control assembly includes a retention vacuum assembly that is configured to apply a retention vacuum between the charge of composite material and the flexible substrate, optionally wherein the retention vacuum assembly includes a retention vacuum manifold that is defined by the flexible substrate.

B23. The apparatus of any of paragraphs B1-B22, wherein the apparatus further includes a locating assembly that is configured to align the composite-substrate assembly with the layup mandrel, optionally wherein the locating assembly includes at least one alignment pin that extends through the flexible substrate and into a respective alignment pin receptacle that is defined by the layup mandrel.

B24. The apparatus of any of paragraphs B1-B23, wherein the apparatus further includes a retention structure that is configured to retain the composite-substrate assembly on the outer surface of the layup mandrel, optionally wherein the retention structure includes a plurality of retention pins that extend through the flexible substrate and into a respective plurality of retention pin receptacles that are defined by the layup mandrel.

B25. The apparatus of any of paragraphs B1-B24, wherein the apparatus further includes a heating assembly that is configured to heat the composite-substrate assembly.

B26. The apparatus of any of paragraphs B1-B25, wherein the apparatus further includes a charge compaction assembly that is configured to compact the charge of composite material on the flexible substrate, optionally wherein the charge compaction assembly includes at least one of a vacuum bag and a vacuum chuck.

B27. The apparatus of any of paragraphs B1-B26, wherein the apparatus further includes a skin compaction assembly that is configured to compact the charge of composite material on the outer surface of the layup mandrel.

B28. The apparatus of paragraph B27, wherein the skin compaction assembly is configured to apply a compaction vacuum between the flexible substrate and the outer surface of the layup mandrel to compact the charge of composite material on the outer surface of the layup mandrel.

B29. The apparatus of paragraph B28, wherein the skin compaction assembly includes a compaction vacuum manifold that is defined by the flexible substrate and is configured to provide the compaction vacuum.

B30. The apparatus of paragraph B29, wherein the skin compaction assembly further includes a compaction vacuum source that is in fluid communication with the compaction vacuum manifold.

C1. The method of any of paragraphs A1-A51 or the apparatus of any of paragraphs B1-B30, wherein the charge of composite material includes a plurality of fibers in a resin material, optionally wherein the plurality of fibers includes at least one of a plurality of carbon fibers, a plurality of polymeric fibers, and a plurality of glass fibers, and further optionally wherein the resin material includes at least one of an epoxy, an adhesive, and a polymeric resin.

C2. The method of any of paragraphs A1-A51 or C1 or the apparatus of any of paragraphs B1-C1, wherein the charge of composite material includes a pre-impregnated composite material, and optionally a pre-impregnated composite tape.

C3. The method of any of paragraphs A1-A51 or C1-C2 or the apparatus of any of paragraphs B1-C2, wherein the flexible substrate is formed from at least one of a polymeric material, a plastic, a polycarbonate, a polyester, a metal, and aluminum.

C4. The method of any of paragraphs A1-A51 or C1-C3 or the apparatus of any of paragraphs B1-C3, wherein the flexible substrate is solid and substantially free of voids.

C5. The method of any of paragraphs A1-A51 or C1-C4 or the apparatus of any of paragraphs B1-C4, wherein the flexible substrate defines one or more voids therein.

C6. The method of any of paragraphs A1-A51 or C1-05 or the apparatus of any of paragraphs B1-05, wherein the flexible substrate is defined by a first planar wall, a second planar wall, and a plurality of elongate webs that extend between the first planar wall and the second planar wall, optionally wherein the first planar wall, the second planar wall, and the plurality of elongate webs define a plurality of elongate channels, optionally wherein the flexible substrate is a panel, and further optionally wherein the flexible substrate is a double-walled panel.

C7. The method of any of paragraphs A1-A51 or C1-C6 or the apparatus of any of paragraphs B1-C6, wherein a sealing structure is operatively attached to the flexible substrate and extends around a periphery of the charge of composite material when the charge of composite material is operatively attached to the flexible substrate, wherein the sealing structure is configured to form a fluid seal between the flexible substrate and the outer surface of the layup mandrel when the composite-substrate assembly is operatively located on the layup mandrel.

C8. The method of any of paragraphs A1-A51 or C1-C7 or the apparatus of any of paragraphs B1-C7, wherein the outer surface of the layup mandrel defines a contour of an inner surface of at least one of an aircraft, a portion of an aircraft, an airframe, a portion of an airframe, a fuselage, a portion of a fuselage, a fuselage barrel, a portion of a fuselage barrel, a wing, a portion of a wing, an elevator, a portion of an elevator, a rudder, a portion of a rudder, a flap, a portion of a flap, an engine nacelle, a portion of an engine nacelle, an engine cowl, a portion of an engine cowl, a stabilizer, and a portion of a stabilizer.

C9. The method of any of paragraphs A1-A51 or C1-C8 or the apparatus of any of paragraphs B1-C8, wherein the composite structure includes at least one of an aircraft, a portion of an aircraft, an airframe, a portion of an airframe, a fuselage, a portion of a fuselage, a fuselage barrel, a portion of a fuselage barrel, a wing, a portion of a wing, an elevator, a portion of an elevator, a rudder, a portion of a rudder, a flap, a portion of a flap, an engine nacelle, a portion of an engine nacelle, an engine cowl, a portion of an engine cowl, a stabilizer, and a portion of a stabilizer.

C10. The method of any of paragraphs A1-A51 or C1-C9 or the apparatus of any of paragraphs B1-C9, wherein the initial conformation includes a planar, or at least substantially planar conformation.

C11. The method of any of paragraphs A1-A51 or C1-C10 or the apparatus of any of paragraphs B1-C10, wherein the initial conformation includes at least one of a non-planar conformation and an arcuate conformation.

C12. The method of any of paragraphs A1-A51 or C1-C11 or the apparatus of any of paragraphs B1-C11, wherein the intermediate conformation defines at least one of a non-planar conformation and an arcuate conformation.

C13. The method of any of paragraphs A1-A51 or C1-C12 or the apparatus of any of paragraphs B1-C12, wherein the intermediate conformation corresponds to a surface profile of the outer surface of the layup mandrel.

C14. The method of any of paragraphs A1-A51 or C1-C13 or the apparatus of any of paragraphs B1-C13, wherein a radius of curvature that is defined by the intermediate conformation is less than a radius of curvature that is defined by the initial conformation.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a skin of a composite structure on an outer surface of a layup mandrel, the method comprising:

operatively attaching a charge of composite material to a flexible substrate to define an initial conformation for a composite-substrate assembly that includes the charge of composite material and the flexible substrate;

deforming the composite-substrate assembly to an intermediate conformation that is different from the initial conformation, wherein the flexible substrate defines a first edge and a second edge that is substantially opposed to the first edge, and further wherein the deforming includes urging the first edge and the second edge toward one another to define the intermediate conformation;

locating the composite-substrate assembly and the layup mandrel proximal to one another;

affixing the charge of composite material to the outer surface of the layup mandrel; and releasing the charge of composite material from the flexible substrate while retaining the charge of composite material on the outer surface of the layup mandrel.

2. The method of claim 1, wherein the operatively attaching includes applying a retention vacuum between the charge of composite material and the flexible substrate with a retention vacuum manifold that is defined by the flexible substrate.

3. The method of claim 2, wherein the method further includes maintaining the retention vacuum during the deforming to retain the charge of composite material on the flexible substrate.

4. The method of claim 2, wherein the method further includes regulating a magnitude of the retention vacuum during the deforming to control a relative motion between the charge of composite material and the flexible substrate during the deforming.

5. The method of claim 2, wherein the releasing includes ceasing the applying the retention vacuum between the charge of composite material and the flexible substrate.

6. The method of claim 1, wherein the deforming includes deforming such that the composite-substrate assembly defines a concave side and an opposed convex side, wherein the charge of composite material is located on the concave side of the composite-substrate assembly.

7. The method of claim 1, wherein the deforming includes suspending the composite-substrate assembly from a tether.

8. The method of claim 1, wherein, during the operatively attaching, the flexible substrate is located on a non-planar surface of a non-planar transfer tool, wherein the initial conformation corresponds to a surface profile of the non-planar surface of the non-planar transfer tool, and further wherein the flexible substrate is located between the charge of composite material and the non-planar surface of the non-planar transfer tool.

9. The method of claim 1, wherein the urging includes extending a tether between the first edge and the second edge to provide a motive force for the urging.

10. The method of claim 1, wherein the urging includes directing a first external force toward the first edge and concurrently directing a second external force toward the second edge.

11. The method of claim 1, wherein the affixing includes locating the charge of composite material between the outer surface of the layup mandrel and the flexible substrate.

12. The method of claim 1, wherein, subsequent to the operatively attaching and prior to the deforming, the method further includes compacting the charge of composite material onto the flexible substrate.

13. The method of claim 1, wherein, prior to the releasing, the method further includes compacting the charge of composite material on the outer surface of the layup mandrel.

14. The method of claim 13, wherein the compacting the charge of composite material on the outer surface of the layup mandrel includes applying a compaction vacuum between the flexible substrate and the outer surface of the layup mandrel with a compaction vacuum manifold that is defined by the flexible substrate.

15. The method of claim 1, wherein the locating includes indexing the composite-substrate assembly to the layup mandrel.

16. The method of claim 1, wherein the charge of composite material is a first charge of composite material, and further wherein the method includes repeating at least the operatively attaching, the deforming, the affixing, and the releasing a plurality of times to retain a plurality of charges of composite material on the outer surface of the layup mandrel and define the skin for the composite structure.

17. A method of assembling a skin of a composite structure on an outer surface of a layup mandrel, the method comprising:
   operatively attaching a charge of composite material to a flexible substrate to define an initial conformation for a composite-substrate assembly that includes the charge of composite material and the flexible substrate;
   deforming the composite-substrate assembly to an intermediate conformation that is different from the initial conformation, wherein the deforming includes suspending the composite-substrate assembly form a tether;
   locating the composite-substrate assembly and the layup mandrel proximal to one another;
   affixing the charge of composite material to the outer surface of the layup mandrel; and
   releasing the charge of composite material from the flexible substrate while retaining the charge of composite material on the outer surface of the layup mandrel.

18. The method of claim 17, wherein the method further includes conforming the composite-substrate assembly to the outer surface of the layup mandrel by tightening the tether to draw the charge of composite material into contact with the outer surface of the layup mandrel.

19. A method of assembling a skin of a composite structure on an outer surface of a layup mandrel, the method comprising:
   operatively attaching a charge of composite material to a flexible substrate to define an initial conformation for a composite-substrate assembly that includes the charge of composite material and the flexible substrate wherein, during the operatively attaching, the flexible substrate is located on a non-planar surface of a non-planar transfer tool, wherein the initial conformation corresponds to a surface profile of the non-planar surface of the non-planar transfer tool, and further wherein the flexible substrate is located between the charge of composite material and the non-planar surface of the non-planar transfer tool;
   deforming the composite-substrate assembly to an intermediate conformation that is different from the initial conformation;
   locating the composite-substrate assembly and the layup mandrel proximal to one another;
   affixing the charge of composite material to the outer surface of the layup mandrel; and
   releasing the charge of composite material from the flexible substrate while retaining the charge of composite material on the outer surface of the layup mandrel.

20. The method of claim 19, wherein the deforming includes inflating a deformation bladder that is located between the flexible substrate and the non-planar surface of the non-planar transfer tool.

\* \* \* \* \*